(12) United States Patent
Minagawa et al.

(10) Patent No.: US 6,980,214 B2
(45) Date of Patent: Dec. 27, 2005

(54) METHODS AND APPARATUS FOR SHADING OBJECT DRAWINGS IN VIDEO GAMES

(75) Inventors: Hiroshi Minagawa, Tokyo (JP); Yoshinori Tsuchida, Tokyo (JP)

(73) Assignee: Square Co., Ltd., Tokyo (JP)

( * ) Notice: Subject to any disclaimer, the term of this patent is extended or adjusted under 35 U.S.C. 154(b) by 94 days.

(21) Appl. No.: 09/751,393

(22) Filed: Dec. 27, 2000

(65) Prior Publication Data

US 2001/0018362 A1    Aug. 30, 2001

(30) Foreign Application Priority Data

Dec. 28, 1999    (JP)    ................................. 11-375164

(51) Int. Cl.⁷ .............................................. G06T 15/70
(52) U.S. Cl. ..................................... 345/473; 345/426
(58) Field of Search ............................... 345/419, 421, 345/426, 422, 427, 473, 474, 475, 589, 629, 345/630, 631; 715/706, 757; 382/254, 255

(56) References Cited

U.S. PATENT DOCUMENTS

| | | | |
|---|---|---|---|
| 5,214,758 A * | 5/1993 | Ohba et al. ................... | 345/473 |
| 5,579,454 A * | 11/1996 | Billyard et al. .............. | 345/421 |
| 5,619,629 A * | 4/1997 | Yutaka ......................... | 345/421 |
| 5,947,823 A * | 9/1999 | Nimura ......................... | 463/32 |
| 6,203,431 B1 * | 3/2001 | Miyamoto et al. ........... | 345/419 |
| 6,236,412 B1 * | 5/2001 | Ojima ........................... | 345/474 |
| 6,322,448 B1 * | 11/2001 | Kaku et al. ................... | 463/32 |
| 6,342,892 B1 * | 1/2002 | Van Hook et al. ........... | 345/419 |
| 6,482,086 B1 * | 11/2002 | Rimoto et al. ................ | 463/1 |
| 6,667,741 B1 * | 12/2003 | Kataoka et al. .............. | 345/426 |
| 6,677,858 B1 * | 1/2004 | Faris et al. ................... | 340/573.1 |

FOREIGN PATENT DOCUMENTS

| | | | |
|---|---|---|---|
| JP | 7-85310 | 3/1995 | ............ G06T 15/50 |
| JP | 7-160905 | 6/1995 | ............ G06T 15/00 |

OTHER PUBLICATIONS

StreetFighter Collection, Nov. 25, 1999, http://playstation.hotgames.com/street2/review.htm , pp. 1-5.*
Peterson, 3D Studio MAX2, 1997, New Riders Publishing, pp. 452-458.*
Foley et al., Computer Graphics: Principles and Practice, pp. 612, 672.*

* cited by examiner

Primary Examiner—Ulka J. Chauhan
Assistant Examiner—Enrique L. Santiago
(74) Attorney, Agent, or Firm—Beyer Weaver & Thomas LLP

(57) ABSTRACT

A dummy object is generated by copying an object. A color of the dummy object is set to be brighter than the object and the position of the dummy object is finely adjusted. After that, the object and the dummy object are drawn using the Z sort method. Polygons of the object are added to a sort table as usual, whereas polygons of the dummy object are added to the sort table after such a shift of the first address of the sort table as to locate them behind their actual depth value with respect to the view point. Since the polygons are drawn from the farthest polygon from the view point in the sort table, the object is drawn over the dummy object. In the last stage the dummy object remains only in the part projecting outside the object and the part is drawn in a brighter color than the object.

21 Claims, 21 Drawing Sheets

Fig.3

| OBJECT ID No. (541) | POLYGON ID No. (543) | VERTEX ID No. (545) |
|---|---|---|
| M1 | P1 | V1 |
| | | V2 |
| | | V3 |
| | P2 | V3 |
| | | V2 |
| | | V4 |
| | P3 | V4 |
| | | V5 |
| | | V3 |
| ⋮ | ⋮ | ⋮ |
| ⋮ | ⋮ | ⋮ |

| OBJECT ID No. | VERTEX ID No. | COORDINATE DATA | TEXTURE DATA |
|---|---|---|---|
| M1 | V1 | (X1,Y1,Z1) | (U1,V1) |
| | V2 | (X2,Y2,Z2) | (U2,V2) |
| | V3 | (X3,Y3,Z3) | (U3,V3) |
| | V4 | (X4,Y4,Z4) | (U4,V4) |
| | V5 | (X5,Y5,Z5) | (U5,V5) |
| | ⋮ | ⋮ | ⋮ |
| ⋮ | ⋮ | ⋮ | ⋮ |

Fig.6

| OBJECT ID No. | LIGHTNESS ADJUSTMENT VALUES | COORDINATE ADJUSTMENT VALUES | DEPTH ADJUSTMENT VALUES |
|---|---|---|---|
| M1 | Rd,Gd,Bd | (Xd,Yd,Zd) | Dd |
| M3 | Re,Ge,Be | (Xe,Ye,Ze) | De |
| M8 | Rf,Gf,Bf | (Xf,Yf,Zf) | Df |
| ⋮ | ⋮ | ⋮ | ⋮ |

Fig.15

| PIXEL ID No. (641) | COLOR DATA (R,G,B) (643) | 1064 |
|---|---|---|
| 1 | | |
| 2 | | |
| 3 | | |
| ⋮ | ⋮ | |

Fig.16

| 0 | 1 | 2 | – – – – | 318 | 319 |
|---|---|---|---|---|---|
| 320 | 321 | 322 | – – – – | 638 | 639 |
| | | | | | |
| | | | – – – – | 76798 | 76799 |

| PIXEL ID No. | Z VALUE |
|---|---|
| 1 | |
| 2 | |
| 3 | |
| ⋮ | ⋮ |

METHODS AND APPARATUS FOR SHADING OBJECT DRAWINGS IN VIDEO GAMES

BACKGROUND OF THE INVENTION

1. Field of the Invention

The present invention relates to a video game and, more particularly, the technology for shading an object in a virtual space.

2. Related Background Art

In recent years a variety of rendering techniques have been studied for shading in the surface of the object placed in a virtual, three-dimensional space in the field of video games. For shading the object placed in the virtual 3D space, luminance computation is executed in consideration of various factors including the property of a light source, the positional relation among the light source, the object, and the view point, the texture of the surface of the object, and so on. Then realistic shading can be made for the image by drawing the image after transparent transformation, based on the result of the luminance computation.

However, the phenomena described below can be encountered when the projection image is drawn so as to accurately reflect the result of the luminance computation. For example, where the object such as a character or the like is placed in the virtual space under presence of little light, the whole projection image becomes so dark that the character is imperceptibly fused into the background. On the other hand, where the object is placed in the very bright virtual space, the whole projection image becomes so bright that the character is imperceptibly fused into the background. When the projection image is drawn so as to accurately reflect the result of the luminance computation in this way, there occurs some cases wherein the object becomes hard to recognize in the projection image drawn. It is thus desirable that at least an object to be noted be definitely discriminated from the background image so as to be recognized by the user.

SUMMARY OF THE INVENTION

An object of the present invention is to enhance the object by shading part of the contours of the object, so as to facilitate recognition of the object in the image.

According to a first aspect of the present invention, an object drawing method in a video game for drawing an object in a virtual space is a method comprising: generating a dummy object of the object; determining positions of the object and the dummy object so that the dummy object thus generated is positioned behind the object and overlaps only in part with the object when observed from a view point; and drawing the object at the position thus determined and drawing the dummy object at the determined position except for an overlapping portion between the object and the dummy object when observed from the view point and in a lightness different from that of the object.

The part of the dummy object not overlapping with the object when observed from the view point is drawn in the lightness different from that of the object, i.e., so as to be brighter or darker than the object. For example, where the whole virtual space is dark and the part of the dummy object not overlapping with the object when observed from the view point is drawn so as to be brighter than the object, the contour part of the object is drawn in a brighter color. Therefore, the above method can enhance the object, so as to facilitate the recognition of the object in the image.

It is also possible to employ such a configuration that in the position determination as described above, the positions of the object and the dummy object are determined so that the generated dummy object is positioned behind the object when observed from the view point and so that there is deviation between a straight line connecting a predetermined reference position of the object and the view point and a straight line connecting the view point and a position in the dummy object corresponding to the predetermined reference position of the object.

It is also possible to employ such a configuration that in the drawing as described above, the dummy object and the object are drawn at the respective determined positions in the order named. This is the configuration to which the so-called Z sort method is applied.

Further, it is also possible to employ such a configuration that in the drawing as described above, a hidden surface removal treatment using a Z buffer is carried out to draw the object at the determined position and draw the dummy object at the determined position and in the lightness different from that of the object. This is the configuration to which the so-called Z buffer method is applied.

It is also possible to employ such a configuration that in the drawing as described above, the object is drawn at the determined position and the dummy object is drawn at the determined position except for the overlapping portion between the object and the dummy object when observed from the view point and in the lightness higher than that of the object. On the other hand, it can also be contemplated that the dummy object is drawn so as to be darker than the object.

According to a second aspect of the present invention, an object drawing method in a video game is a method comprising, generating a dummy object of the object, setting a distance from a view point of each polygon forming the dummy object and the object so that the dummy object thus generated is positioned behind the object and overlaps only in part with the object when observed from the view point; and drawing each polygon forming the object and each polygon forming the dummy object in a lightness different from that of a corresponding polygon of the object, in accordance with a drawing order of the polygons resulting from sequencing of the polygons from the greatest distance from the view point, set in the setting. This is the method to which the so-called Z sort method is applied.

According to a third aspect of the present invention, an object drawing method in a video game is a method comprising, generating a dummy object of the object, setting a distance from a view point of each polygon forming the dummy object and the object so that the dummy object thus generated is positioned behind the object and overlaps only in part with the object when observed from the view point; and drawing a pixel according to a polygon having a distance closest to the view point, set in the setting, out of polygons projectable into the pixel, wherein when the polygon projected into the pixel is a polygon forming the object, the pixel is drawn according to the polygon and wherein when the polygon projected into the pixel is a polygon forming the dummy object, the pixel is drawn in a lightness different from that of the corresponding polygon of the object. This is the method to which the so-called Z buffer method is applied.

The program can be made so that the computer executes the object drawing method in the video game according to either of the first to the third aspects of the present invention. In that case, the above-stated modifications for the first to the third aspects can also be applied to the program. The program according to the present invention is stored in a storage medium or a storage device, for example, such as the CD-ROM, floppy disc, memory cartridge, memory, hard disc, and so on. The video game apparatus described below can be realized by making the computer read in the program stored in the storage medium or storage device. The storage media permit the program according to the present invention to be distributed and sold readily as software products independent of the apparatus. Further, when the program is carried out by the hardware such as the computer or the like, the technology of the present invention can be carried out readily by the hardware such as the computer or the like.

According to a fourth aspect of the present Invention, a video game apparatus, which comprises a computer-readable storage medium storing a program for a video game which draws an object in a virtual space; and a computer which reads out at least one of said program from said recording medium to perform, by reading out at least one of said program from said storage medium, generating a dummy object of the object, determining positions of the object and the dummy object so that the dummy object thus generated in the generation is positioned behind the object and overlaps only in part with the object when observed from a view point, drawing the object at the position thus determined in the position determination and drawing the dummy object at the position determined in the position determination except for an overlapping portion between the object and the dummy object when observed from the view point and in a lightness different from that of the object.

According to a fifth aspect of the present invention, a video game apparatus, which comprises a computer-readable storage medium storing a program for a video game which draws an object comprised of a plurality of polygons in a virtual space; and a computer which reads out at least one of said program from said recording medium to perform, by reading out at least one of said program from said storage medium, generating a dummy object of the object, setting a distance from a view point of each polygon forming the dummy object and the object so that the dummy object thus generated in the generation is positioned behind the object and overlaps only in part with the object when observed from the view point; and drawing each polygon forming the object and each polygon forming the dummy object in a lightness different from that of a corresponding polygon of the object, in accordance with a drawing order of the polygons resulting from sequencing of the polygons from the greatest distance from the view point, set in the setting.

According to a sixth aspect of the present invention, a video game apparatus, which comprises a computer-readable storage medium storing a program for a video game which draws an object comprised of a plurality of polygons in a virtual space; and a computer which reads out at least one of said program from said recording medium to perform, by reading out at least one of said program from said storage medium, generating a dummy object of the object; setting a distance from a view point of each polygon forming the dummy object and the object so that the dummy object thus generated by the generation is positioned behind the object and overlaps only in part with the object when observed from the view point; and drawing a pixel according to a polygon having a distance closest to the view point, set in the setting, out of polygons projectable into the pixel, wherein when the polygon projected into the pixel is a polygon forming the object, the pixel is drawn according to the polygon and wherein when the polygon projected into the pixel is a polygon forming the dummy object, the pixel is drawn in a lightness different from that of the corresponding polygon of the object.

According to a seventh aspect of the present invention, a video game apparatus is an apparatus comprising: a computer; and a computer-readable storage medium storing a program to be executed by the computer, wherein the program is structured so as to make the computer perform: generating a dummy object of the object; determining positions of the object and the dummy object so that the dummy object thus generated in the generation is positioned behind the object and overlaps only in part with the object when observed from a view point; and drawing the object at the position thus determined in the position determination and drawing the dummy object at the position determined in the position determining process except for an overlapping portion between the object and the dummy object when observed from the view point and in a lightness different from that of the object.

BRIEF DESCRIPTION OF THE DRAWINGS

FIG. 3 is a drawing to show an example of a polygon table;

FIG. 5 is a drawing to show an example of a vertex table;

FIG. 6 is a drawing to show an example of a dummy object setting table;

FIG. 15 is a diagram to show an example of a pixel table;

FIG. 16 is a schematic diagram to show an example of a display screen for explaining pixel identification numbers;

FIG. 17 is a diagram to show an example of a Z buffer;

DESCRIPTION OF THE PREFERRED EMBODIMENTS

Figure 1:
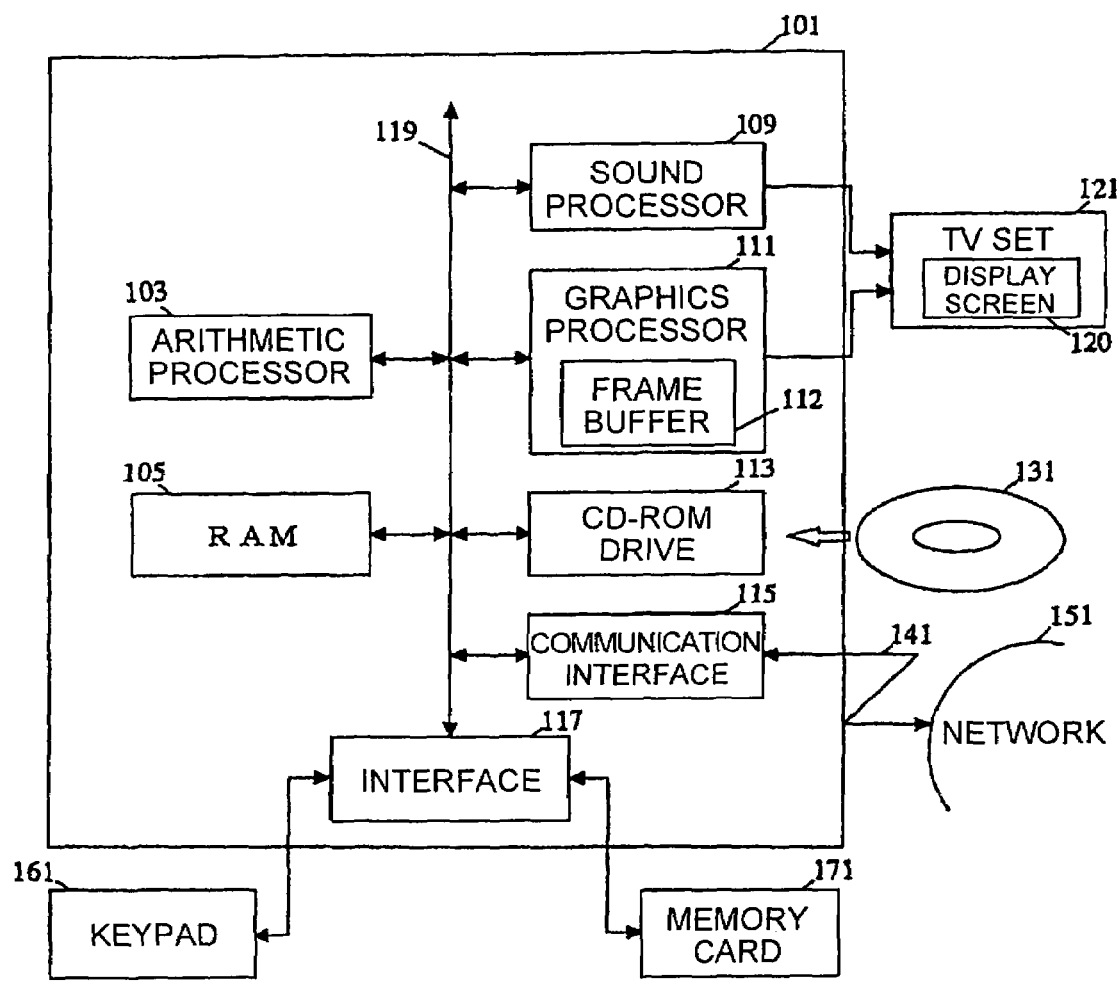
FIG. 1 is a block diagram to show the structure of a home-use game machine.

In carrying out one embodiment according to the present invention by means of a computer program, an example of a home-use game machine 101 for carrying out the computer program is presented in FIG. 1. The home-use game machine 101 is provided, for example, with an arithmetic processing unit 103, a RAM (Random Access Memory) 105, a sound processing unit 109, a graphics processing unit 111, a CD-ROM drive 113, a communication interface 115, and an interface section 117, which are connected to an internal bus 119. The graphics processor 111 incorporates a frame buffer 112.

The sound processor 109 and the graphics processor 111 of the home-use game machine 101 are connected to a TV set 121 having a display screen 120. A CD-ROM 131, which is capable of being loaded on or unloaded from the CD-ROM drive 113, is loaded on the CD-ROM drive 113. The communication interface 115 is connected via a communication medium 141 to a network 151. A keypad 161 with control buttons, and a memory card 171 are connected to the interface section 117.

The arithmetic processor 103 incorporates a CPU, a ROM (Read Only Memory), etc. and executes a program stored in the CD-ROM 131 to control the home-use game machine 101. The RAM 105 is a work area of the arithmetic processor 103. The memory card 171 is a storage area for saving data to be referenced by the program. When the program under execution by the arithmetic processor 103 provides a command to carry out sound output, the sound processor 109 interprets the command and outputs a sound signal to the TV set 121.

In accordance with a drawing command from the arithmetic processor 103, the graphics processor 111 generates image data to write it in the frame buffer 112. Then it outputs a signal for display on the image screen 120 of the thus written image data, to the TV set 121. The CD-ROM drive 113 reads the program and data on the CD-ROM 131 out thereof. The communication interface 115 is connected via the communication medium 141 to the network 151 to perform input/output control of data communication with another computer or the like. The interface section 117 outputs input information from the keypad 161, to the RAM 105, and the arithmetic processor 103 interprets the input from the keypad 161 to carry out arithmetic processing.

The program and data according to one embodiment of the present invention are initially stored, for example, in the CD-ROM 131. Then the program and data are read by the CD-ROM drive 113 upon execution and transferred to the RAM 105. The arithmetic processor 103 handles the program and data according to the present invention, loaded on the RAM 105, to output a drawing command to the graphics processor 111. Intermediate data is saved in the RAM 105. The graphics processor 111 executes processing according to the drawing command from the arithmetic processor 103, writes the image data in the frame buffer 112, and outputs a signal for display thereof on the display screen 120, to the TV set 121.

Detailed descriptions will be given below of the algorithm of the program of the present invention carried out in the home-use game machine 101 as described above, and the data used therein.

Embodiment 1

Figure 2:
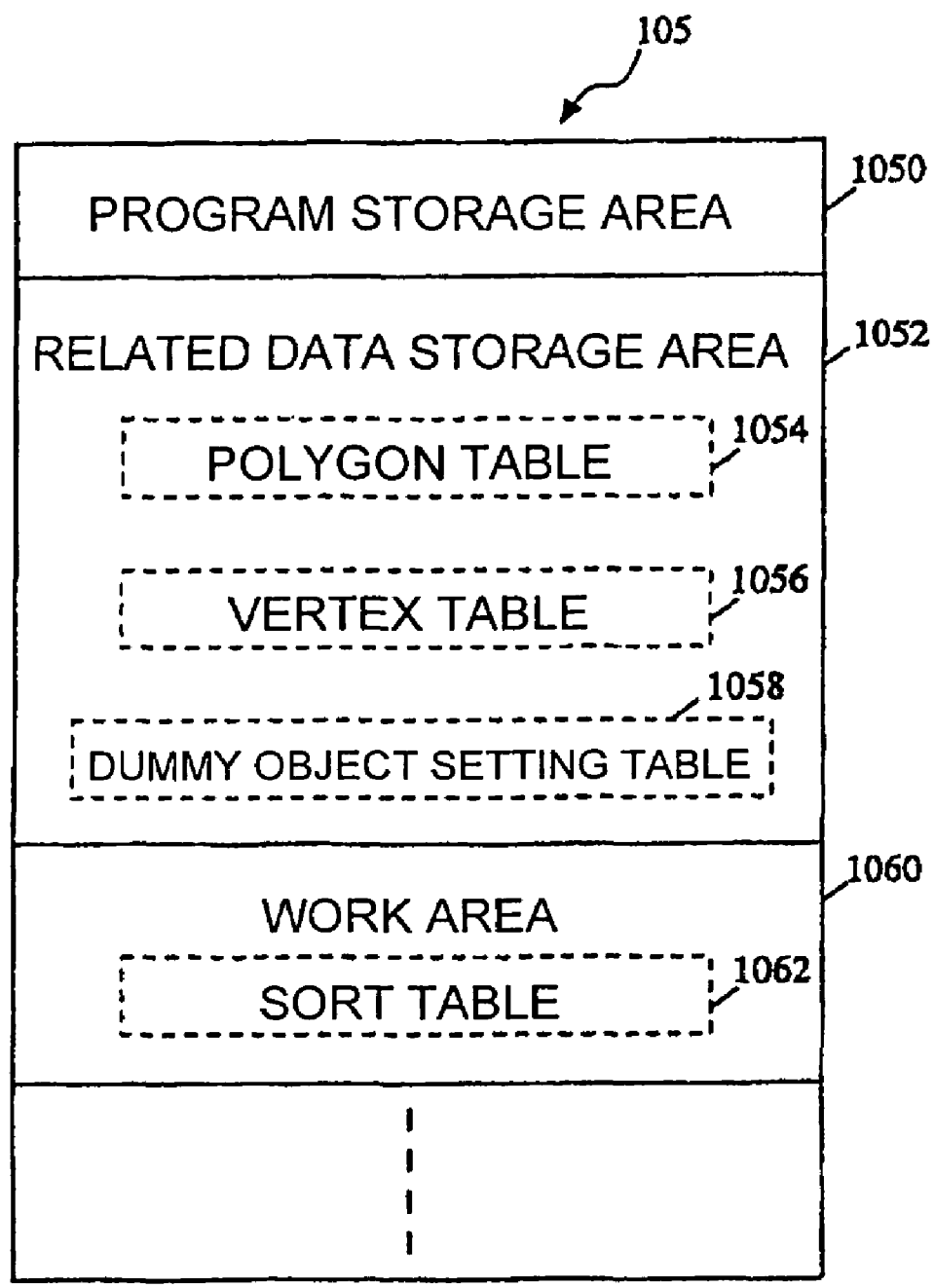
FIG. 2 is a block diagram to show a state of RAM in Embodiment 1.

FIG. 2 shows a state of the RAM 105, for example, where the program and data according to the embodiment 1 of the present invention, which were stored in the CD-ROM 131, are loaded on the RAM 105 by the CD-ROM drive 113 and the program according to the present invention is under execution. In the present embodiment 1 the RAM 105 consists of at least a program storage area 1050, a related data storage area 1052, and a work area 1060. The program saved in the program storage area 1050 will be described hereinafter. The related data storage area 1052 includes a polygon table 1054, a vertex table 1056, and a dummy object setting table 1058. The work area 1060 includes a sort table 1062.

An example of the polygon table 1054 included in the related data storage area 1052 is presented in FIG. 3. The polygon table 1054 is a table for specifying an object or objects to be drawn, polygons constituting each object, and vertexes constituting each of the polygons. For specifying each object to be drawn, there is a column 541 provided for storing object identification (ID) numbers. In the example of FIG. 3 the object ID number of M1 is indicated in the column 541.

For specifying the polygons constituting each object, there is a column 543 provided for storing polygon identification numbers. In the example of FIG. 3, the polygon ID numbers of P1, P2, and P3 are indicated for three polygons constituting the object M1 in the column 543.

For specifying the vertexes constituting each polygon, there is a column 545 provided for storing vertex identification numbers. In the example of FIG. 3, the vertex ID numbers of V1, V2, and V3 are indicated for the vertexes constituting the polygon P1. Further, the vertex ID numbers of V3, V2, and V4 are indicated for the vertexes constituting the polygon P2. In addition, the vertex ID numbers V4, V5, and V3 are indicated for the vertexes constituting the polygon P3.

Figure 4:
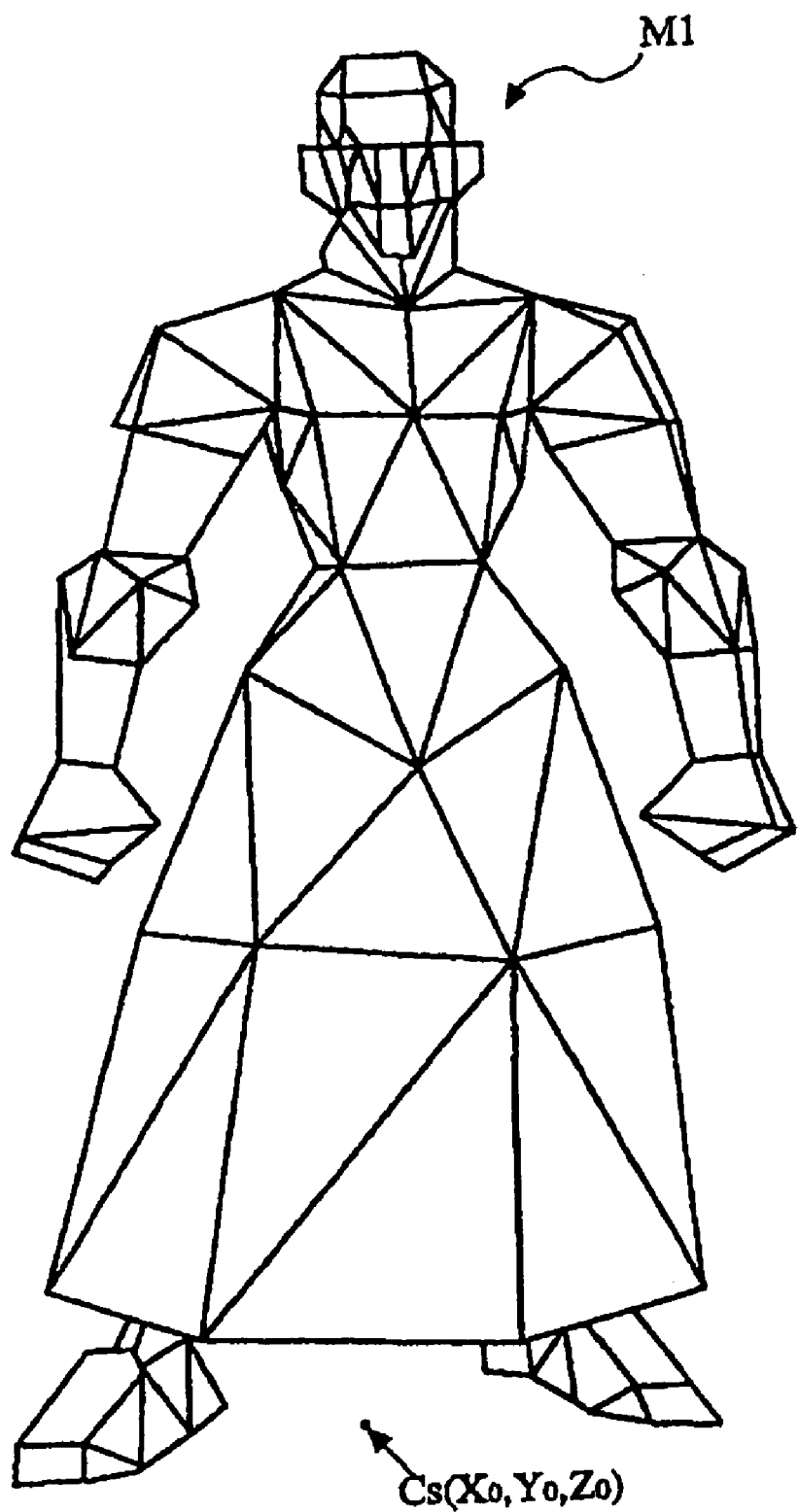
FIG. 4 is a drawing to show an example of an object.

For example, the object M1 to be drawn is composed of an aggregate of polygons as illustrated in FIG. 4. In the polygon table 1054 the ID numbers of the polygons constituting the object M1 are stored in the column 543 of the polygon ID numbers corresponding to the object M1. The ID numbers of vertexes constituting each polygon are stored in the column 545 of vertex ID numbers corresponding to each polygon.

As illustrated in FIG. 4, a reference position Cs (X0, Y0, Z0) is set for the object, and a position of each polygon is defined as displacement from this reference position Cs. As described hereinafter, the reference position of object is also used for determining a position of a dummy object. An example of the vertex table 1056 included in the related data storage area 1052 is presented in FIG. 5. The vertex table 1056 is a table for specifying the object(s) to be drawn, vertexes of polygons constituting each object, coordinate values of the vertexes, and texture coordinates. For specifying the object(s) to be drawn, there is a column 561 provided for storing the object ID number(s). In the example of FIG. 5 the object ID number of M1 is indicated in the column 561.

For specifying the vertexes of polygons constituting each object, there is a column 563 provided for storing the vertex ID numbers. In the example of FIG. 5 the vertex ID numbers of V1, V2, V3, V4, and V5 are indicated in the column 563. For specifying the coordinate values of each vertex, there is a column 565 provided for storing vertex data. In the example of FIG. 5 the coordinate values of the vertex V1 are (X1, Y1, Z1). The coordinate values of the vertex V2 are (X2, Y2, Z2). The coordinate values of the vertex V3 are (X3, Y3, Z3). The coordinate values of the vertex V4 are (X4, Y4, Z4). The coordinate values of the vertex V5 are (X5, Y5, Z5).

For specifying the texture coordinates of each vertex, there is a column 567 of texture data provided. In the example of FIG. 5 the texture coordinates of the vertex V1 are (U1, V1). The texture coordinates of the vertex V2 are (U2, V2). The texture coordinates of the vertex V3 are (U3, V3). The texture coordinates of the vertex V4 are (U4, V4). The texture coordinates of the a vertex V5 are (U5, V5).

An example of the dummy object setting table 1058 included in the related data storage area 1052 is presented in FIG. 6. The dummy object setting table 1058 is a table for storing data necessary for shading operation for each object to be subjected to shading. An object ID number of each object to be subjected to shading is stored in a column 581 of object ID number in FIG. 6. In the example of FIG. 6, the objects M1, M3, and M8 are designated as objects to be subjected to shading.

For each of the objects to be subjected to shading, a dummy object used for the shading operation is generated. This dummy object is basically a copy of the object to be subjected to shading and is generated from the data of the object to be subjected to shading in accordance with the data stored in the dummy object setting table 1058.

A lightness adjustment value column 585 in FIG. 6 stores a lightness adjustment value for determining the lightness of each dummy object used for the shading operation, for each of the objects to be subjected to shading. For example, the lightness of each dummy object is data obtained by increasing or decreasing only the lightness in the color data of the corresponding object to be subjected to shading. The lightness adjustment values stored in this lightness adjustment value column 585 can also be, for example, values to be added to or to be subtracted from the color data of the object to be subjected to shading.

The lightness adjustment values stored in the lightness adjustment value column 585 can also be values used instead of the color data of the object to be subjected to shading. In the example of FIG. 6 the lightness adjustment values of the object M1 are (Rd, Gd, Bd), the lightness adjustment values of the object M3 are (Re, Ge, Be), and the lightness adjustment values of the object M8 are (Rf, Gf, Bf).

The lightness adjustment values are set to values differing depending upon the circumstances in the virtual space. For example, when the lightness of the dummy object is increased (to make the dummy object brighter) and when the distance is close between the view point and the object to be subjected to shading, such lightness adjustment values are set so as to make the lightness higher. On the other hand, when the distance is far between the view point and the object to be subjected to shading, such lightness adjustment values are set so as not to make the lightness so high. This setting can suppress the flicker of shading in part of the contours of the object.

Further, when it is assumed that the object to be subjected to shading is illuminated with rays on a virtual basis, the lightness adjustment values are set to a value in consideration of the color of the rays. For example, in the case of the object on the background of a sunset glow, the lightness adjustment values can be set so as to increase the lightness by an orange color.

A coordinate adjustment value column 587 in FIG. 6 stores coordinate adjustment values for such movement of each dummy object, for example, as to properly provide the object to be subjected to shading, with a bright portion or a dark portion. The coordinate adjustment values are values in the world coordinate system.

If the dummy object is placed at the same position as the object to be subjected to shading, it will be superimposed on the object and either one of the objects becomes invisible. If the dummy object is placed in front of the object to be subjected to shading when observed from the view point, the object to be subjected to shading will not be displayed. Further, if the dummy object is placed immediately behind the object to be subjected to shading when observed from the view point, the dummy object will be completely hidden behind the object to be subjected to shading.

Therefore, the coordinate adjustment values are used to locate the dummy object at a position a little shifted from the object to be subjected to shading. In other words, the position of the dummy object is adjusted so that there is deviation between a straight line connecting the view point and a reference position of the object to be subjected to shading and a straight line connecting the view point and a position in the dummy object corresponding to the predetermined reference position of the object to be subjected to shading. Since in the present embodiment the dummy object is a copy of the object to be subjected to shading, the reference positions of the objects are the same. Therefore, the position of the dummy object is adjusted by the coordinate adjustment values so as to cause the deviation between the two straight lines each connecting the view point and the reference position thereof.

If the positional deviation is too large between the dummy object and the object to be subjected to shading, the two objects will look to be simply spaced. Therefore, the dummy object is located at a position a little shifted from the object to be subjected to shading, by the coordinate adjustment values. In order to give a color of a different lightness from that of the object, to part of the contours around the object to be subjected to shading, the reference position of the dummy object is shifted from the reference position of the object to be subjected to shading, by the coordinate adjustment values stored in the coordinate adjustment value column 587.

In the example of FIG. 6, the coordinate adjustment values of the dummy object against the object M1 are (Xd, Yd, Zd), the coordinate adjustment values of the dummy object against the object M3 are (Xe, Ye, Ze), and the coordinate adjustment values of the dummy object against the object M8 are (Xf, Yf, Zf).

The coordinate adjustment values also vary depending upon the circumstances in the virtual space. For example, when the lightness of the dummy object is increased (to make the dummy object brighter) and when the distance is close between the view point and the object to be subjected to shading, the coordinate adjustment values are set to a value so as to make the deviation small between the dummy object and the object to be subjected to shading, when observed from the view point. On the other hand, if the distance is far between the view point and the object to be subjected to shading, the coordinate adjustment values are set so as to make the deviation relatively large between the dummy object and the object to be subjected to shading, when observed from the view point. This setting can suppress the flicker of shading in part of the contours of the object.

Further, when it is assumed that the object to be subjected to shading is illuminated with rays on a virtual basis, the coordinate adjustment values indicating the deviation between the dummy object and the object to be subjected to shading with respect to the view point may be set in consideration of the position of a virtual light source.

A column 589 of depth adjustment value in FIG. 6 stores adjustment values for shifting the first address value of the sort table described hereinafter. The position of a dummy object is set behind an object to be subjected to shading, when observed from the view point. As a consequence, the object to be subjected to shading is drawn as it is, whereas the dummy object is drawn only in the part not overlapping with the object to be subjected to shading, when observed from the view point.

In order to set the dummy object behind the object to be subjected to shading with respect to the view point, it is also possible to adjust coordinates of each vertex of polygons forming the dummy object, but the number of transactions to be handled becomes large in that case. The present embodiment employs the Z sort method as a hidden surface removal method. In the sort table used in the Z sort method, storage positions of polygons of each dummy object are adjusted by shifting the first address of the sort table. By shifting the first address of the sort table, the position of the dummy object is set behind the object to be subjected to shading, when observed from the view point.

In the example of FIG. 6 the depth adjustment value is Dd on the occasion of adding each polygon of the dummy object corresponding to the object M1, to the sort table. The depth adjustment value is De on the occasion of adding each polygon of the dummy object corresponding to the object M3, to the sort table. The depth adjustment value is Df on the occasion of adding each polygon of the dummy object corresponding to the object M8, to the sort table.

The point herein is that in practice the dummy object is relatively positioned behind the original object to be subjected to shading, when observed from the view point. Therefore, it can also be contemplated that the dummy object is set at the position of the original object and the original object is set at a position closer to the view point.

Figure 7:
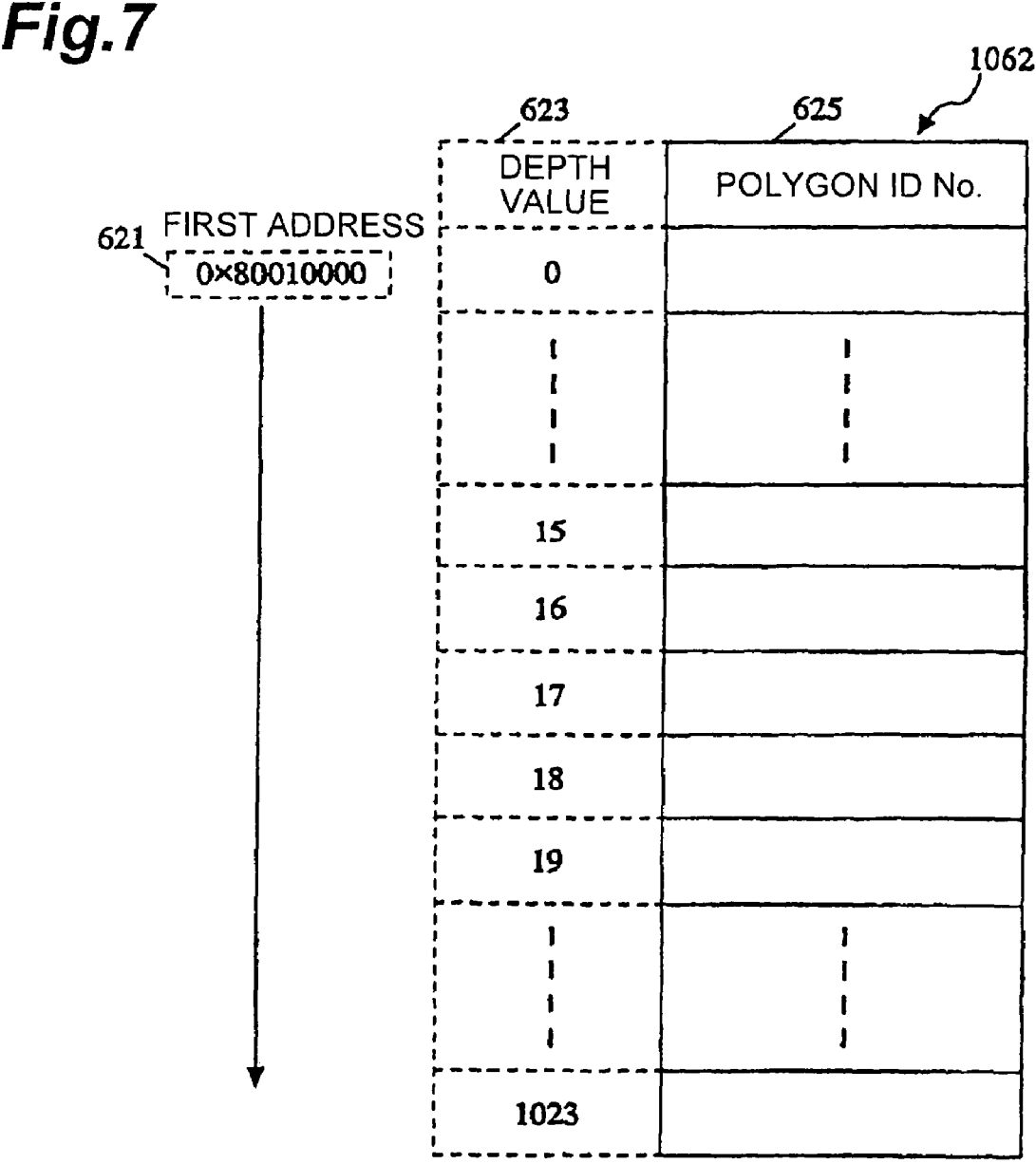
FIG. 7 is a schematic diagram for explaining a sort table.

An example of the sort table 1062 included in the work area 1060 is presented in FIG. 7. The sort table 1062 is a table for determining a drawing order in making use of the Z sort method as a technique for hidden surface removal. A polygon ID number of a polygon to be drawn is added to an address corresponding to a depth value representing a distance of the drawn polygon from the view point. As a result, the polygons are sorted according to their depth values. The larger the depth value of the polygons the more distant the polygons are positioned from the view point. The polygons are drawn in the order of the depth values thereof. As a consequence, images of polygons closer to the view point are drawn over images of farther polygons, thus effecting hidden surface removal.

In the example of FIG. 7 the polygon ID number of the depth value 0 will be stored in the first address 621 of the sort table 1062. In practice, a pointer to data of that polygon is stored in the address corresponding to the depth value of the polygon.

In FIG. 7, 0x80010000 of the first address 621 and the depth value column 623 are indicated only for understanding of the present embodiment. Under normal circumstances there exists only the column 625 of polygon ID number. Namely, the portions indicated by the dotted lines in FIG. 7 are presented for easier understanding of the present embodiment. In this example, the smaller the depth value, the nearer the polygon to the view point. Thus 1023 is the most distant. Each address of the polygon ID number column 625 is assigned successively in the increasing order of the depth values from the first address.

A depth value of each polygon is, for example, an average of depth values of the respective vertexes constituting the polygon. Another possible method is to use the largest depth value out of the depth values of the vertexes constituting the polygon. It is also possible to use the smallest depth value. Further, it is also possible to use a depth value of a predetermined point in the polygon, for example, a depth value at the center of gravity thereof.

The algorithm of the program in the present embodiment will be described below referring to FIG. 8, FIG. 9, FIG. 10, FIG. 11, FIG. 12 and FIG. 13.

Upon starting, based on the operating system stored in the ROM or the like, the arithmetic processor 103 makes the CD-ROM drive 113 read the program and data necessary for execution of image processing and a game out of the CD-ROM 131 and transfer them to the RAM 105. Then the arithmetic processor 103 executes the program transferred to the RAM 105, thereby implementing the processing described below.

It is noted here that among the control and processing carried out in the home-use game device 101 there are also some cases wherein practical control and processing is carried out by circuitry except for the arithmetic processor 103 in cooperation therewith. For convenience' sake of description, the control and processing associated with the arithmetic processor 103 will be described below as being assumed to be carried out directly by the arithmetic processor 103.

In practice the program and data necessary for execution of the image processing and the game are successively read out of the CD-ROM 131 according to the preceding circumstances of processing in response to a command from the arithmetic control unit 103 to be transferred to the RAM 105. In the description hereinafter, however, explanation will be omitted about the reading of data from the CD-ROM 131 and the transfer thereof to the RAM 105 for easier understanding of the invention.

Figure 8:
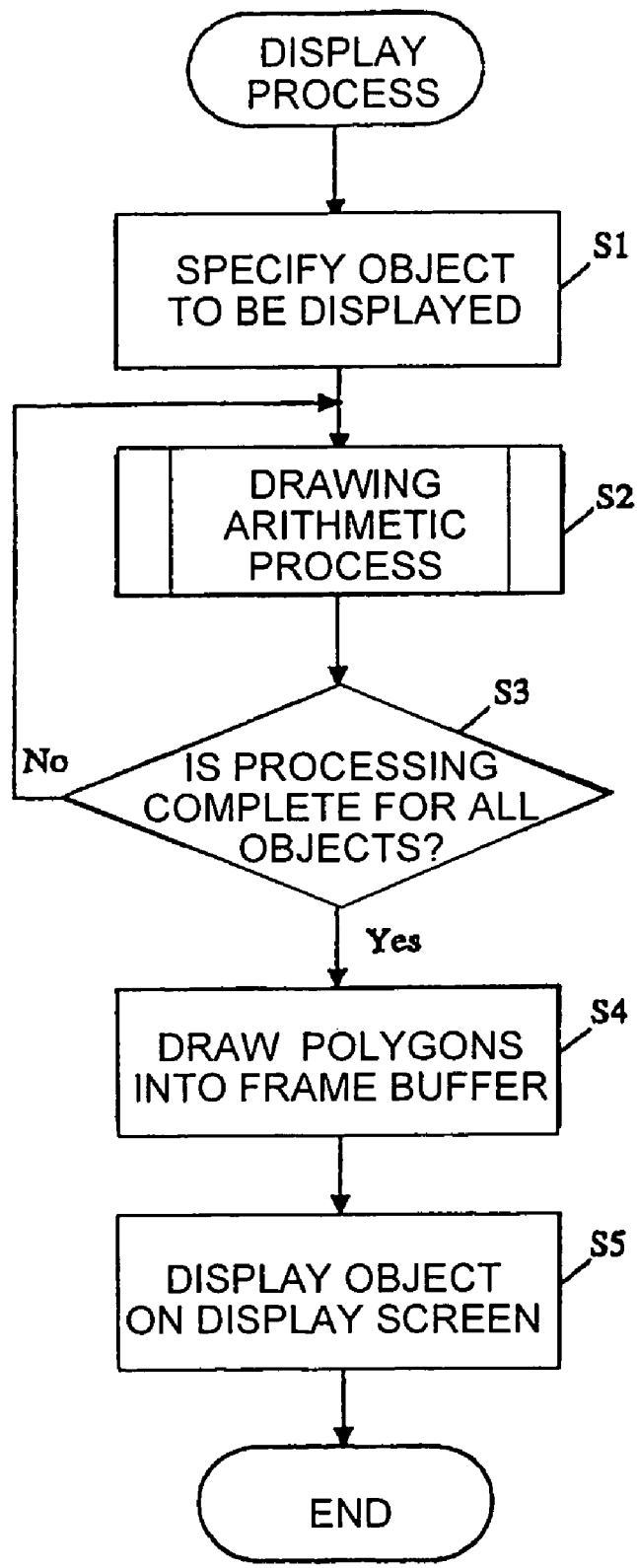
FIG. 8 is a flowchart to show a flow of display processing in Embodiment 1.

The main flow of the display process is illustrated in FIG. 8. First, objects to be displayed are specified (step S1). Next, a drawing arithmetic process is carried out for one object out of the objects to be displayed (step S2). The drawing arithmetic process will be detailed hereinafter. It is then determined whether the drawing arithmetic process has been completed for all the objects to be displayed (step S3).

If there exists an unprocessed object among the objects to be displayed, the flow will return to step S2. When the drawing arithmetic process has been completed for all the objects to be displayed, a drawing process is carried out into the frame buffer 112 (step S4). Then the image data stored in the frame buffer 112 is displayed on the display screen 120 of the TV set 121 (step S5).

In the present embodiment the drawing process is carried out in association with the hidden surface removal treatment by the Z sort method. Namely, the polygons are written into the frame buffer 112 in order from the farthest polygon, i.e., from the polygon with the largest depth value with respect to the view point in the sort table 1062 illustrated in FIG. 7. Drawing of a certain polygon is carried out according to the processing described below. Interpolation is effected, based on coordinates and colors at the respective vertexes forming the polygon, to compute colors of respective pixels inside the polygon.

If texture mapping is not required, the colors thus computed as described above will be written as colors of the respective pixels in the frame buffer 112. If the texture mapping is required on the other hand, interpolation will be carried out based on the texture coordinates of the respective vertexes forming the polygon to compute texture coordinates of the respective pixels inside the polygon. Then colors generated by use of texel values in the texture coordinates and the colors of the pixels computed above will be written as colors of the respective pixels in the frame buffer 112.

The position of the dummy object is determined behind the object to be subjected to shading, when observed from the view point. If the dummy object located in back does not overlap with the object to be subjected to shading at all, the dummy object will be drawn prior to the object to be subjected to shading.

If the dummy object located in back overlaps with the object to be subjected to shading on the other hand, their polygons will be written in the frame buffer 112 in order from the most distant polygon with respect to the view point in the sort table 1062. Therefore, there are some polygons of the object to be subjected to shading that are written in the frame buffer 112 prior to the polygons of the dummy object.

Next, the drawing arithmetic process of step S2 will be described referring to FIG. 9. First, one unprocessed object to be displayed is specified (step S11). The present posture of one unprocessed object to be displayed is computed (step S13). Positions of the polygons constituting the object are modified so as to match with the present posture. It is then determined whether the present processing is for a dummy object (step S15). Since in the initial stage one unprocessed object was specified in step S11, the processing is not for a dummy object. Thus the flow transfers to step S17.

In step S17, data of the unprocessed object specified is prepared. For example, the data herein is the data in the polygon table 1054 and the vertex table 1056. Then the data of the unprocessed object thus prepared is subjected to transparent transformation (step S21). The transparent transformation is a process of transforming coordinate values of respective vertexes of each polygon in the world coordinate system to coordinate values in the screen coordinate system. The transparent transformation yields distances from the view point at the respective vertexes of each polygon, i.e., depth values, for each of the polygons constituting the unprocessed object specified.

Then the following processing is carried out for each of the polygons constituting the unprocessed object specified. Namely, a depth value of each polygon is computed from the depth values at the respective vertexes of the polygon, for each of the polygons. For example, in the case of a triangular polygon, the depth value of the polygon is determined as an average of three depth values of the three vertexes. A storage address is computed from the first address of the sort table 1062, using the depth value of each polygon thus computed, and each polygon is added to the sort table 1062 (step S23).

Actually stored in the sort table 1062 is a pointer to the data of each polygon. For adding each polygon forming the unprocessed object specified to the sort table 1062, no shift is given to the first address of the sort table 1062. The polygons are added to the sort table under the initial setting.

Figure 10:
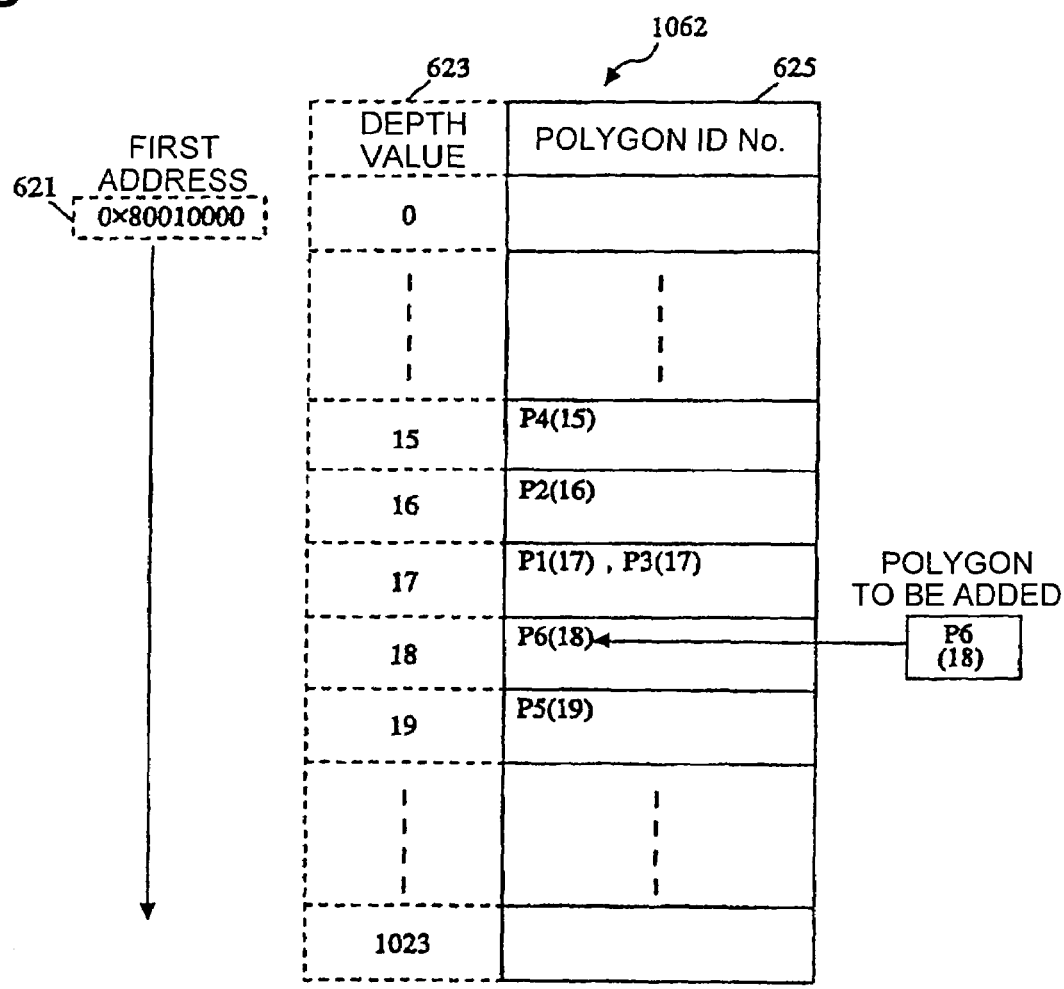
FIG. 10 is a schematic diagram for explaining processing carried out on the occasion of adding a polygon forming an object to the sort table.

FIG. 10 is a drawing for explaining the processing for adding a polygon to the sort table 1062. The first address 621 is the same as in FIG. 7. The polygon of P4 is already stored in the address corresponding to the depth value 15. The depth value in parentheses is described at the rear of the polygon ID number of P4. The illustration of depth values is given for the description hereinafter, but the depth values are not stored actually. The polygon P2 is stored in the address of the depth value 16. The polygons P1 and P3 are stored in the address corresponding to the depth value 17. The polygon P5 is stored in the address corresponding to the depth value 19. For adding the polygon P6, the polygon P6 is added to the address corresponding to the depth value 18, using the data of the depth value 18 of the polygon P6.

Returning to FIG. 9, it is then determined whether the above processing has been done for the unprocessed object specified (step S25). Since the processing has been made for the unprocessed object specified in the first execution, the processor transfers to step S29. In step S29, it is determined whether the unprocessed object specified is a target of shading operation. In this step it can be determined by determining whether the unprocessed object is an object stored in the dummy object setting table 1058, with reference to the dummy object setting table 1058 of FIG. 6.

If the unprocessed object is an object not stored in the dummy object setting table 1058, the processor will transfer to step S3 of FIG. 8, because the process of shading operation is not necessary. If the unprocessed object is an object stored in the dummy object setting table 1058 on the other hand, the processor will move to step S31. In step S31 the object to be processed is switched from one unprocessed object specified, to a corresponding dummy object.

Going back to step S15, the processor again determines whether the present process is for a dummy object. Since the object to be processed was switched to the dummy object in step S31, the processor transfers to step S19 this time. A dummy object setting process is carried out in step S19. The dummy object setting process will be described in detail referring to FIG. 11.

Figure 11:
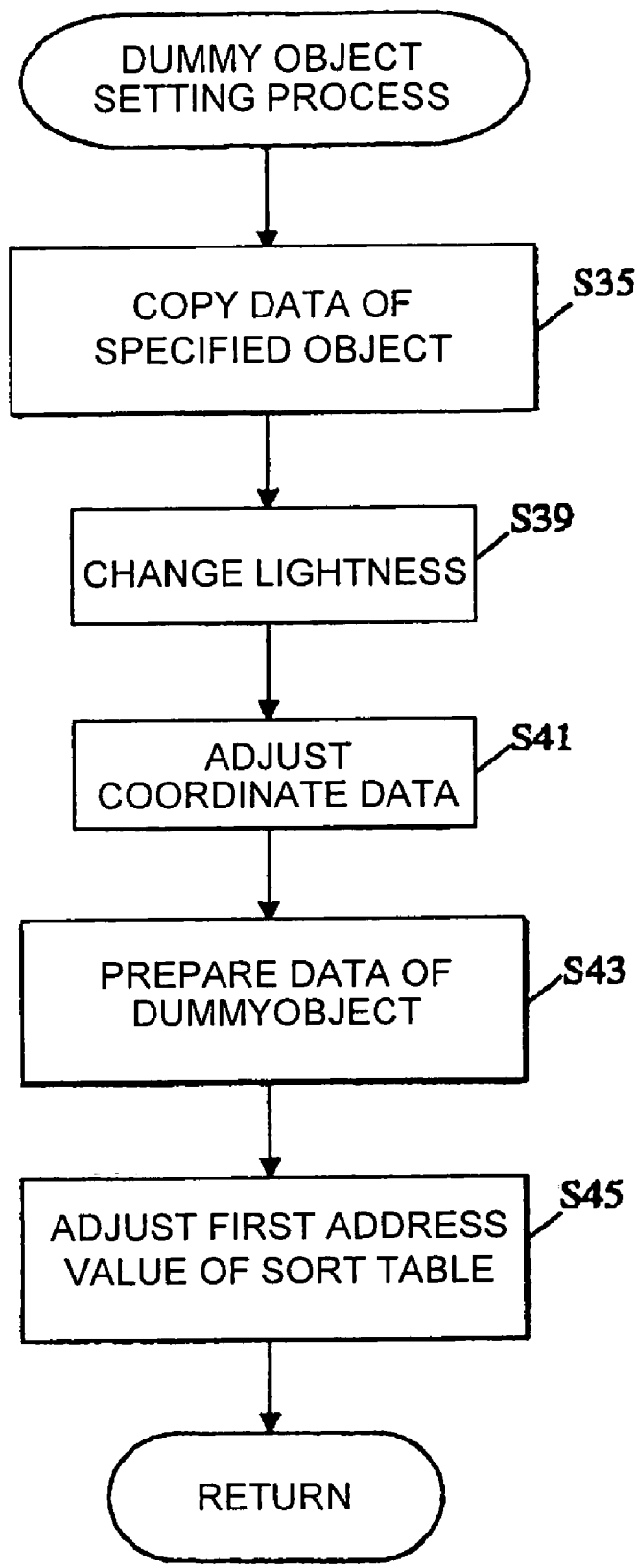
FIG. 11 is a flowchart to show a processing flow of a dummy object setting process in Embodiment 1.

In FIG. 11 a copy is first prepared from the data of one unprocessed object (an object to be subjected to shading) specified and is used as data for the dummy object (step S35). For example, the copy is made by reading in the data in the polygon table 1054 and the vertex table 1056. Next, the lightness of the dummy object is changed (step S39). The lightness of the dummy object is set using the data in the lightness adjustment value column 585 of the dummy object setting table 1058. It is also possible to replace the color data of the dummy object with the color data stored in the lightness adjustment value column 585.

In addition, adjustment is made for the coordinate data of the dummy object (step S41). The coordinate values in the coordinate adjustment value column 587 of the dummy object setting table 1058 are used for the adjustment of the coordinate data. Namely, the reference position of the dummy object is shifted by the coordinate adjustment values. Then the data of the dummy object generated is prepared for the transparent transformation (step S43). In the last stage, the first address of the sort table 1062 is adjusted by the data in the depth adjustment value column 589 of the dummy object setting table 1058 (step S45). After this stage, the flow transfers to the process of step S21 of FIG. 9.

Figure 9:
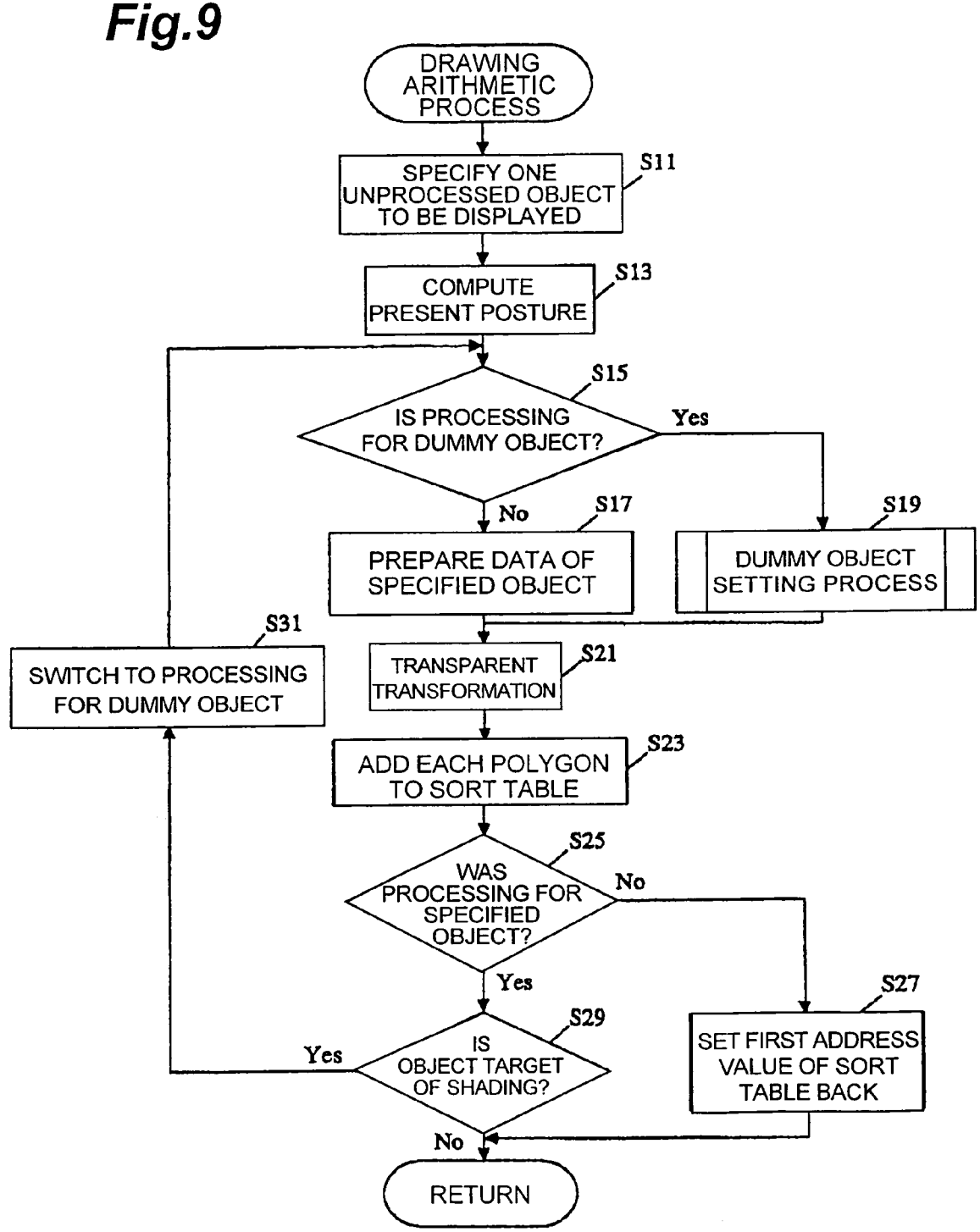
FIG. 9 is a flowchart to show a processing flow of a drawing arithmetic process in Embodiment 1.

In FIG. 9 the data of the dummy object prepared is subjected to the transparent transformation (step S21). The transparent transformation yields the distances from the view point at the respective vertexes of each polygon, i.e., the depth values thereof, for each of the polygons constituting the dummy object.

In the next step the following processing is carried out for each of the polygons constituting the dummy object. Namely, the depth value of each polygon is computed from the depth values at the respective vertexes of the polygon, for each of the polygons. For example, in the case of a triangular polygon, an average of three depth values at the three vertexes is calculated and is used as a depth value of the polygon. Then a storage address is computed from the first address of the sort table 1062, using the depth value of the polygon thus computed, and each polygon is added to the sort table 1062 (step S23).

Figure 12:
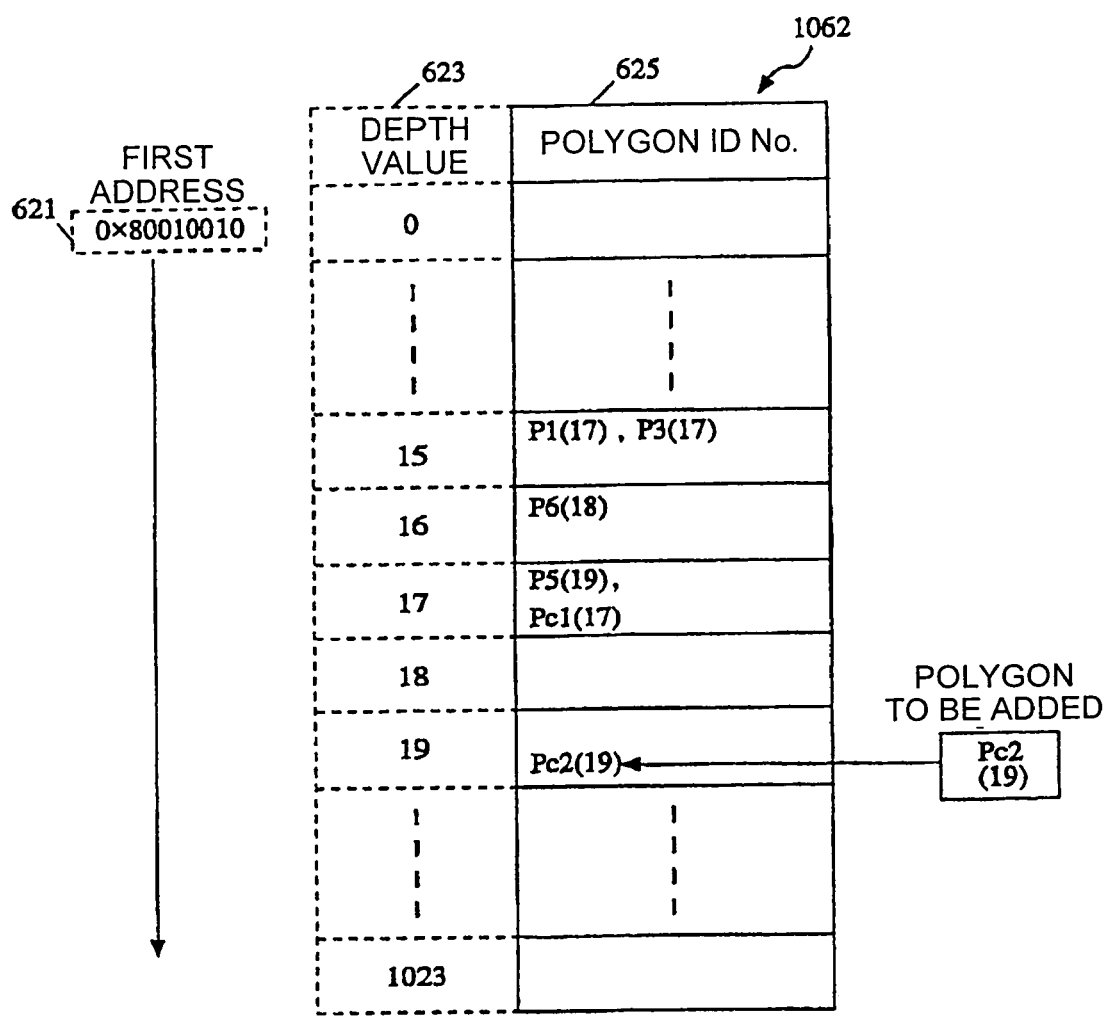
FIG. 12 is a schematic diagram for explaining processing carried out on the occasion of adding a polygon forming a dummy object to the sort table.

The first address of the sort table 1062 was adjusted in step S45 of FIG. 11. FIG. 12 shows the adjusted state of the first address. In the sort table 1062 of FIG. 12, the first address 621 is shifted by 16 bytes, from 0x80010000 to 0x80010010 (the first address 621'). Namely, the address corresponding heretofore to the depth value 2 is carried down to the first address 621' and all the addresses thereafter are also carried down in the same way. Since the first address is shifted as in step S45, there is the need for provision of extra areas above and below the sort table 1062.

In FIG. 12 the polygons P1 and P3 whose depth value was 17 before the adjustment of the first address are stored in the address corresponding to the depth value 15. The polygon P6 whose depth value was 18 before the adjustment of the first address is stored in the address corresponding to the depth value 16. The polygon P5 whose depth value was 19 before the adjustment of the first address is stored in the address corresponding to the depth value 17.

Also stored in the address corresponding to the depth value 17 is the polygon Pc1 of the depth value 17, which is a polygon forming the dummy object. For adding the polygon Pc2 of the depth value 19 forming the dummy object to the sort table 1062, it is stored in the address corresponding to the depth value 19 after the shift of the first address, as illustrated in FIG. 12.

Returning to FIG. 9, it is determined whether the object now under processing is the unprocessed object specified in step S11 (step S25). Since the dummy object is now under processing, the flow transfers to step S27. In step S27 the first address of the sort table 1062 is put back to the original value in accordance with completion of the processing of the dummy object (step S27). The adjustment of the first address of the sort table is effected only during the period of processing of the dummy object. Then the processor transfers to step S3 of FIG. 8.

Figure 13:
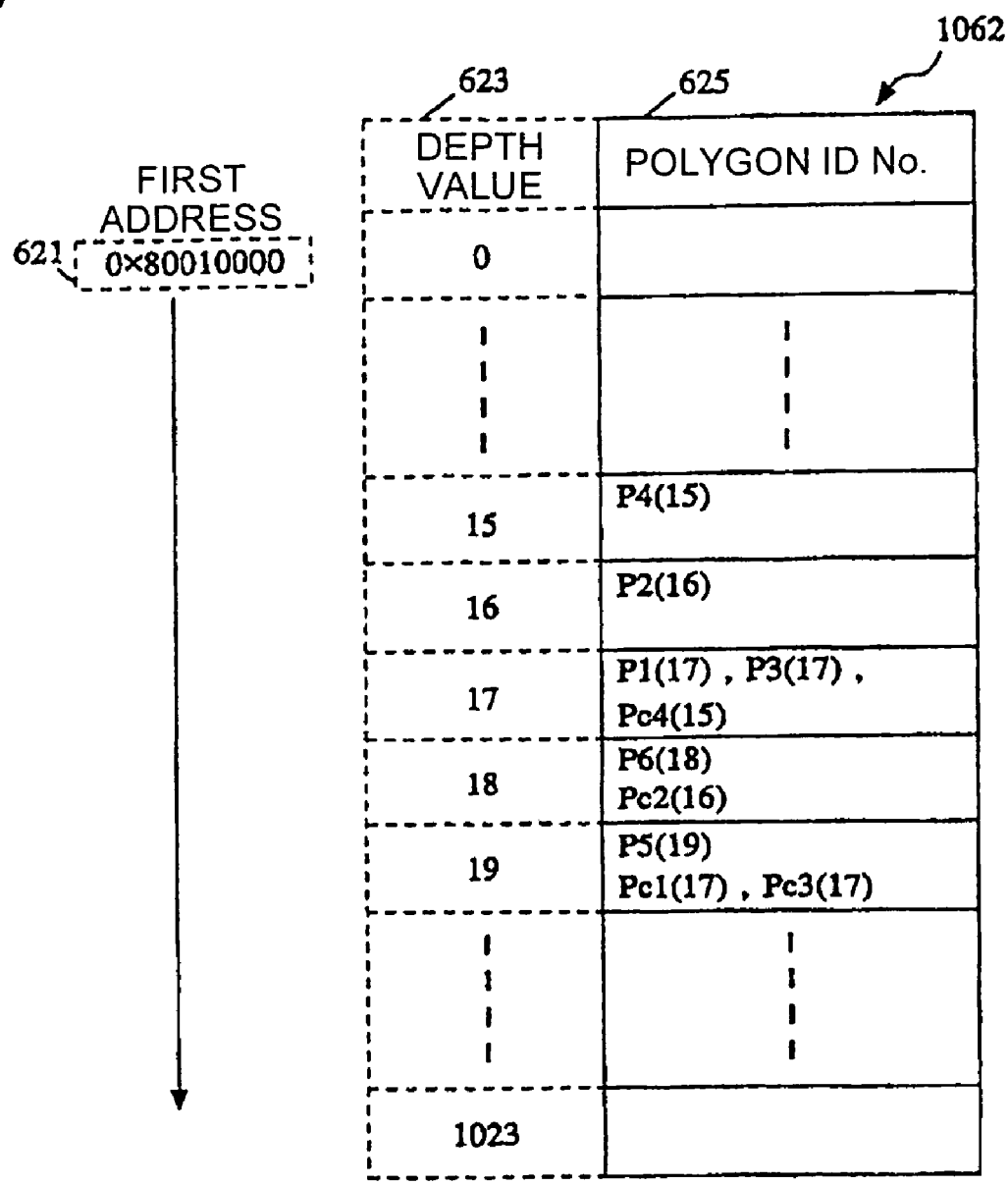
FIG. 13 is a schematic diagram for explaining the sort table in a state in which the first address is set back after storage of polygons of the dummy object and the object.

An example of the sort table 1062 at the stage of completion of step S27 is presented in FIG. 13. In the sort table 1062 of FIG. 13, the value of the first address is the original one. In the sort table 1062 the polygon P4 is stored in the address corresponding to the depth value 15. The polygon P2 is stored in the address corresponding to the depth value 16. The polygon P1 and polygon P3 are stored in the address corresponding to the depth value 17. The polygon Pc4 forming the dummy object is also stored in the address corresponding to the depth value 17. As seen from the value in parentheses, the depth value of the polygon Pc4 is, however, actually 15. This means that the polygon Pc4 forming the dummy object is stored in the address at the depth value of 2 behind the actual value. As a consequence, the dummy object will be positioned at the depth value of 2 behind the corresponding object.

The polygon P6 and polygon Pc2 are stored in the address corresponding to the depth value 18. Since the actual depth value of the polygon Pc2 is 16, it is stored the depth value of 2 behind the actual value. The polygons P5, Pc1, and Pc3 are stored in the address corresponding to the depth value 19. Since the actual depth value of the polygons Pc1 and Pc3 is 17, they are stored the depth value of 2 behind the actual value.

Each of the polygons of the object and the dummy object to be displayed is stored in the sort table 1062 as described above. Then the polygons are drawn into the frame buffer 112 in step S4 of FIG. 8 in order from the most distant polygon with respect to the view point in the sort table 1062.

Then the image drawn in the frame buffer 112 is displayed on the display screen 120 of the TV set 121 in step S5.

In the above-stated processing, the depth values of the dummy object were modified by adjusting the first address of the sort table 1062, in order to give precedence to increasing processing speed. It is, however, also possible to directly adjust the depth values of the respective polygons forming the dummy object, without the adjustment of the first address. It is also possible to adjust the depth values of the respective vertexes of each polygon. The adjustment includes such arithmetic as addition, subtraction, multiplication, and so on.

Further, in the above-stated processing the first address of the sort table 1062 was adjusted during the period of processing of the polygons constituting the dummy object. It is, however, also possible to employ such a configuration that the first address of the sort table 1062 is adjusted during the period of processing of the object corresponding to the dummy object (i.e., during the period of processing of the object to be subjected to shading). This is the configuration in which each polygon forming the original object is stored at a position closer to the view point than the actual position in the sort table 1062. Instead of the adjustment of the first address of the sort table 1062, it is also possible to directly modify the depth values of the respective polygons forming the object.

When the texture mapping is effected on the object to be subjected to shading, the texture mapping is also effected on the dummy object in the same manner. However, the texture of the dummy object is drawn in the color of the lightness set for the dummy object.

A method for changing the lightness can be one of changing the lightness by modifying the color data set for the polygons or one of changing the lightness by modifying the contents of color palettes. In the case of the texture mapping being effected, the lightness can also be modified as a result of change in the lightness of the texture.

In Embodiment 1, the dummy object is generated for the object to be subjected to shading (step S35). Then the lightness of the dummy object is modified by the lightness adjustment values (step S39). Then the position of the dummy object is finely adjusted so that the straight line connecting the view point and the reference position of the object to be subjected to shading deviates from the straight line connecting the view point and the position in the dummy object corresponding to the reference position of the object to be subjected to shading (step S41). After that, the object to be subjected to shading and the dummy object are drawn by the Z-sort method (step S4). Here each polygon forming the object is added to the sort table 1062 as usual. On the other hand, each polygon forming the dummy object is added to the sort table 1062 with such a shift of the first address of the sort table 1062 as to be located behind the actual depth value with respect to the view point (step S23).

Therefore, since the polygons are drawn in order from the most distant polygon from the view point in the sort table 1062, the overlapped portion from the view point of the original object is drawn over the dummy object. At last the dummy object remains only in the part deviating from the object to be subjected to shading and this part is drawn so as to be brighter or darker.

As a consequence, the enhanced display of the object is implemented by the shading in part of the contours of the object, so that the visibility of the object can be enhanced in the projection image drawn.

According to the embodiment 1 of the present invention, the dummy object is generated by copying the data of the original object and setting the lightness different from that of the original object. Then the drawing process is executed to position the dummy object thus generated, obliquely behind the original object, whereby the shading can be effected in part of the contours of the object.

Therefore, the present invention obviates the need for carrying out the process of detecting the contour part (edge part) to be subjected to shading and carrying out the complicated processing of implementing the enhanced display of the detected contour part. The present invention realizes the process of shading in part of the contours of the object by the simple procedures, thereby permitting an increase in the processing speed.

The increase in the processing speed concerning the shading drawing operation is particularly useful for the video games. In the video games, the position and shape of the object to be displayed, the camera works, etc. sequentially vary with time in accordance with manipulation input or the like. Then projection images according to the sequentially varying contents have to be displayed instantly on the screen. If the shading drawing process is complex, the image display speed will be slow even if the object can be drawn with shading. It is thus important that the procedures concerning the shading drawing operation be simple, in order to draw the object without decrease in the display speed.

(Display Examples)

Figure 20:
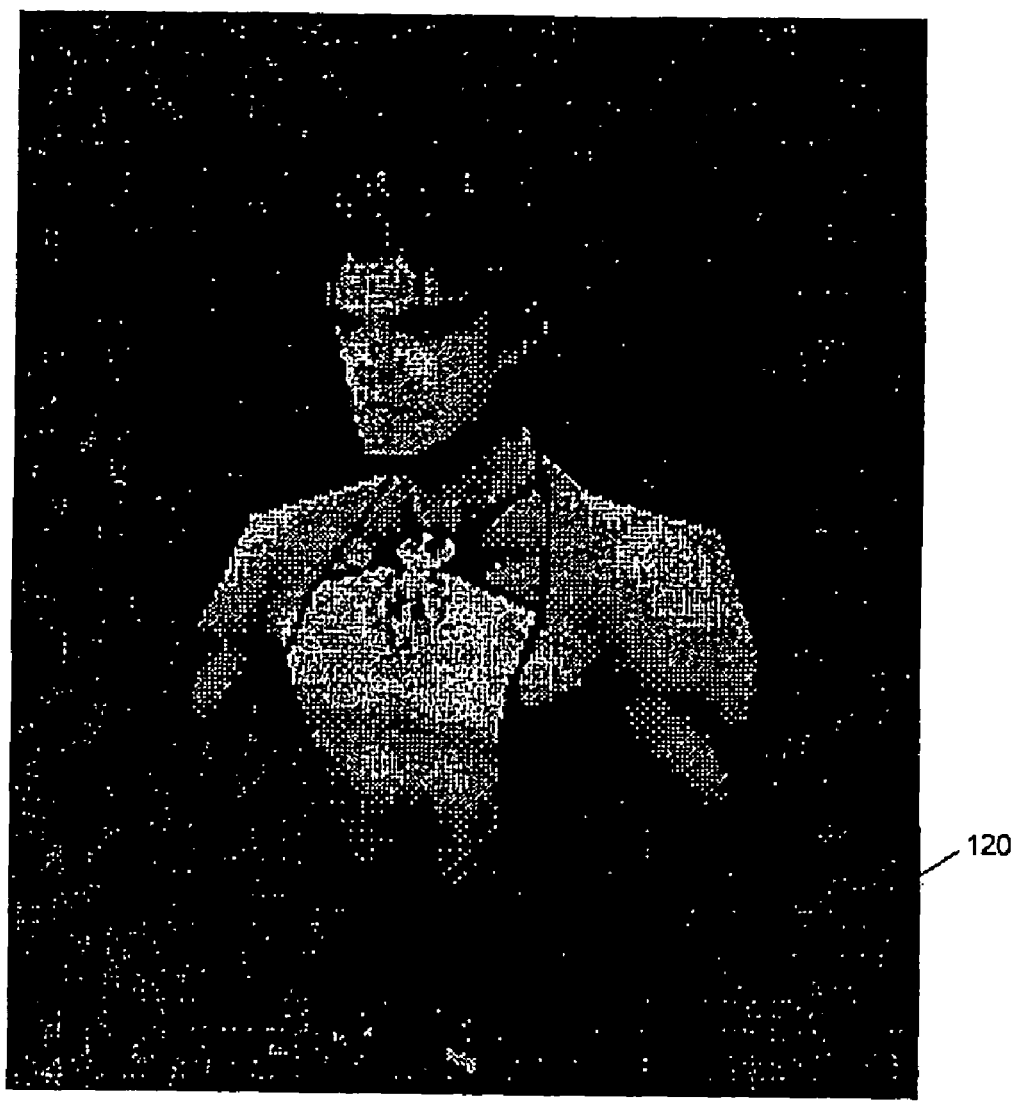
FIG. 20 is a diagram of a display screen example in which an object indicating a character is placed in a gloomy, virtual, three-dimensional space.

Supposing an object indicating a character is placed in a gloomy, virtual, three-dimensional space and this state is drawn as it is, the entire display screen 120 will look darkly depressed as illustrated in FIG. 20. Then, a dummy object (brighter) with a higher lightness than that of the object indicating the character illustrated in FIG. 20 is prepared as described previously. A display example of this dummy object is presented in FIG. 21. When FIG. 20 is compared with FIG. 21, the difference in the lightness is definite between the objects indicating the character.

Figure 21:
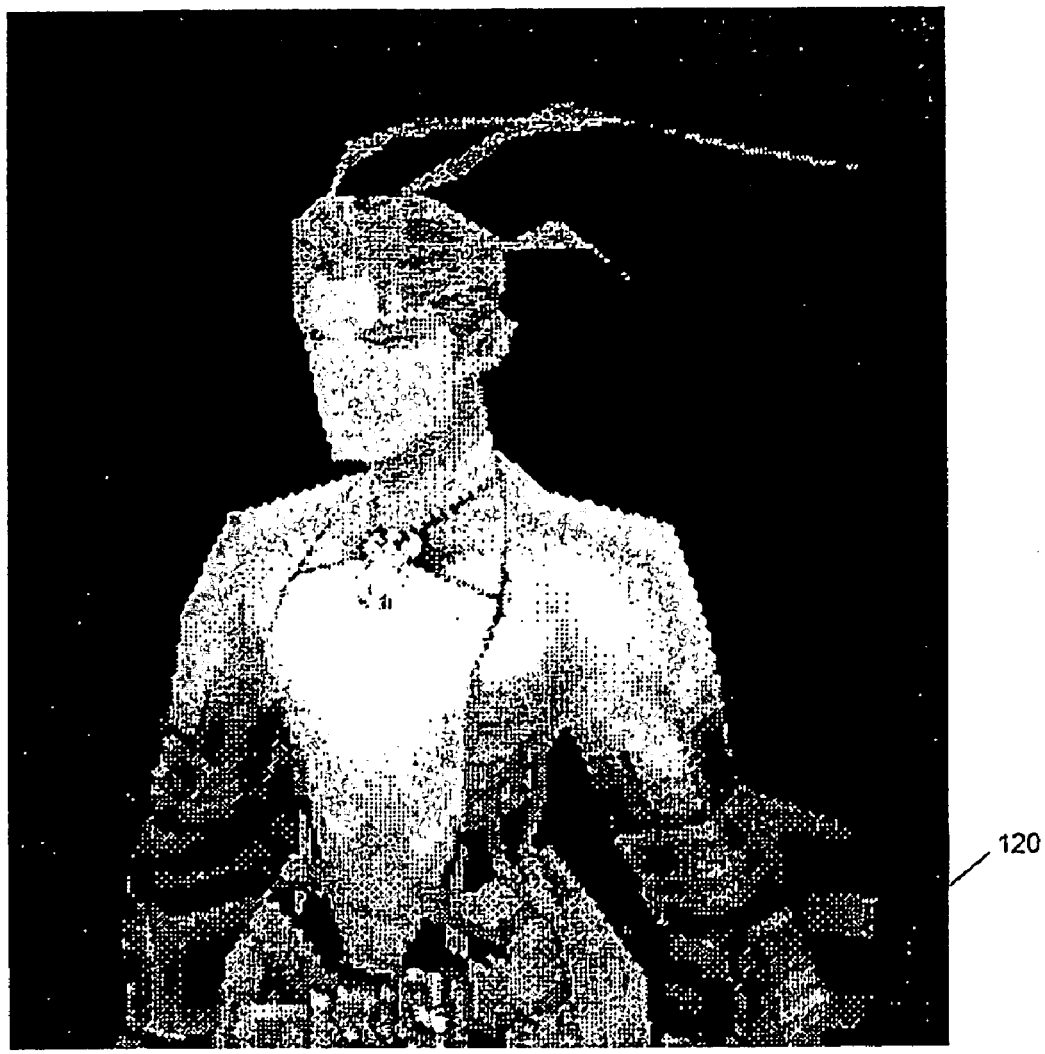
FIG. 21 is a diagram of a display screen example in which a dummy object of the character illustrated in FIG. 20 is drawn.
Figure 22:
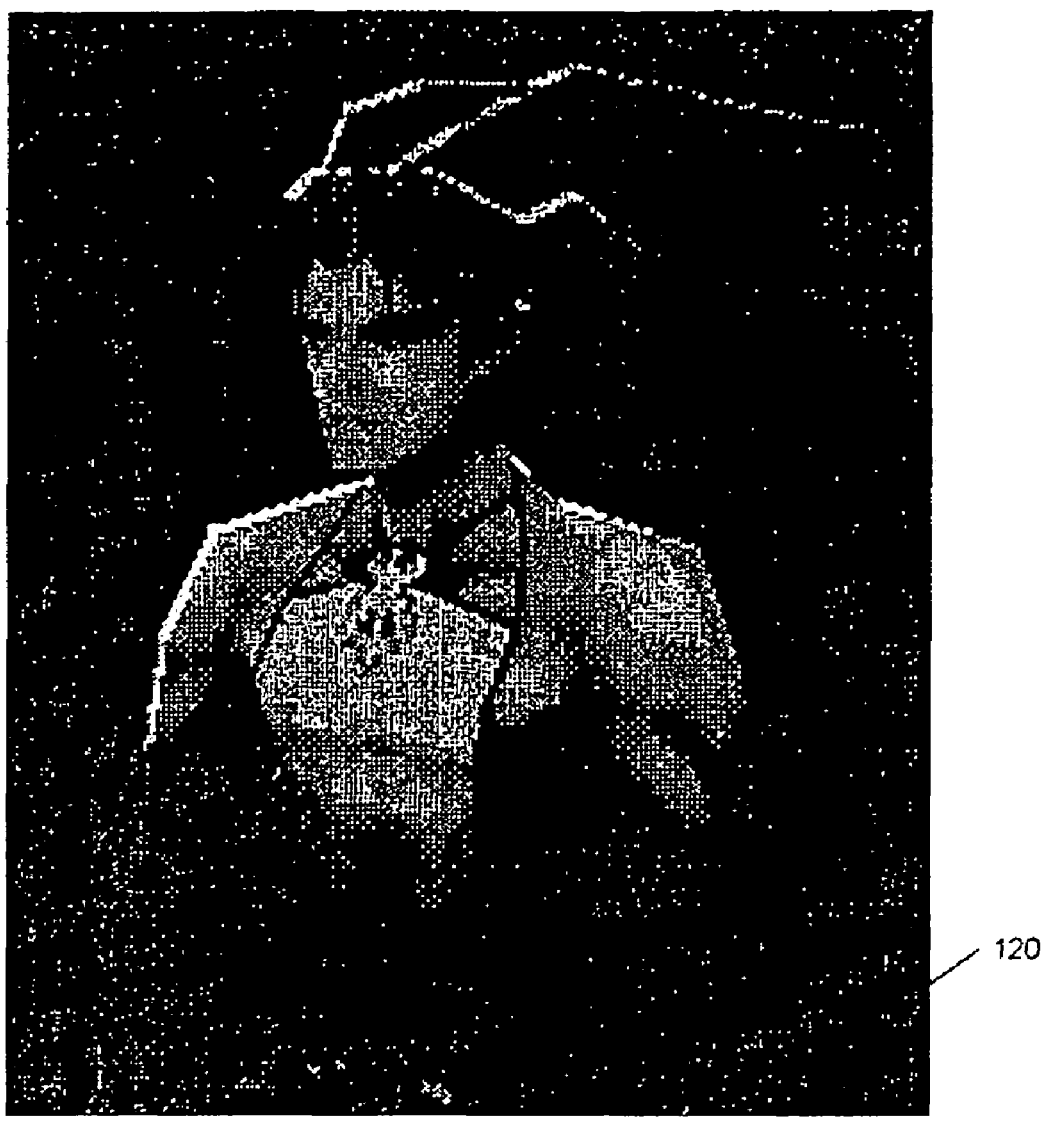
FIG. 22 is a diagram of a display screen example to show a scene in which the dummy object corresponding to the object indicating the character is properly placed in the gloomy, virtual, three-dimensional space.

For example, In accordance with the embodiment 1, the dummy object illustrated in FIG. 21 is placed obliquely behind the original object to be subjected to shading (steps S23, S41) and the dummy object and the original object are drawn (step S4), to obtain a display example illustrated in FIG. 22. In FIG. 22 bright belt like areas appear at the upper edge of the head, at the upper edge of the right shoulder, and at the upper edge of the left shoulder of the character. These areas are portions where visual axes from the view point reach the dummy object without being interrupted by the original object to be subjected to shading. As seen from FIG. 22, the shading in part of the contours of the original object can highlight the object in the projection image to enhance the visibility of the object in the image. Further, the rendering effect is achieved as if the character is illuminated with strong light from the back. This process can also be used as a presentation technique for enhancing the character, in addition to the rear light expression in the embodiments 1 and 2.

Figure 23:
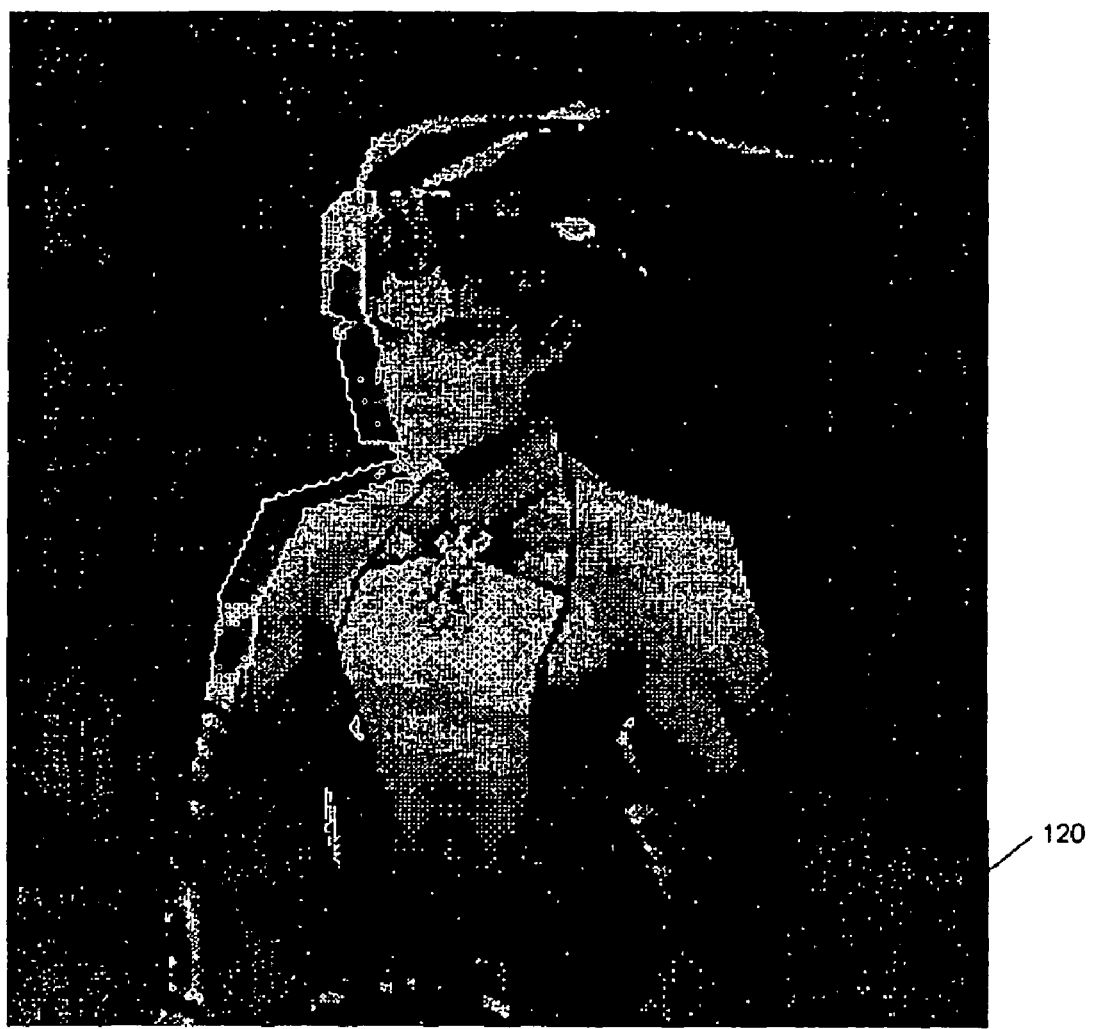
FIG. 23 is a diagram of a display screen example to show a scene in which the dummy object corresponding to the object indicating the character is placed with great deviation therefrom in the gloomy, virtual three-dimensional space.

FIG. 23 shows a display example obtained when the coordinate adjustment values stored in the dummy object setting table 1058 are not proper. Since the dummy object is positioned with large deviation from the original object to be subjected to shading, the two objects appear like simply spaced images with deviation or like a ghost phenomenon of blurred images on TV. In this case the above-stated effect cannot be enjoyed. This verifies that the setting of coordinate adjustment values greatly affects the display result.

Embodiment 2

Embodiment 1 employed the hidden surface removal using the Z sort method in the drawing process, whereas the present embodiment 2 employs the hidden surface removal using the Z buffer in the drawing process.

Figure 14:
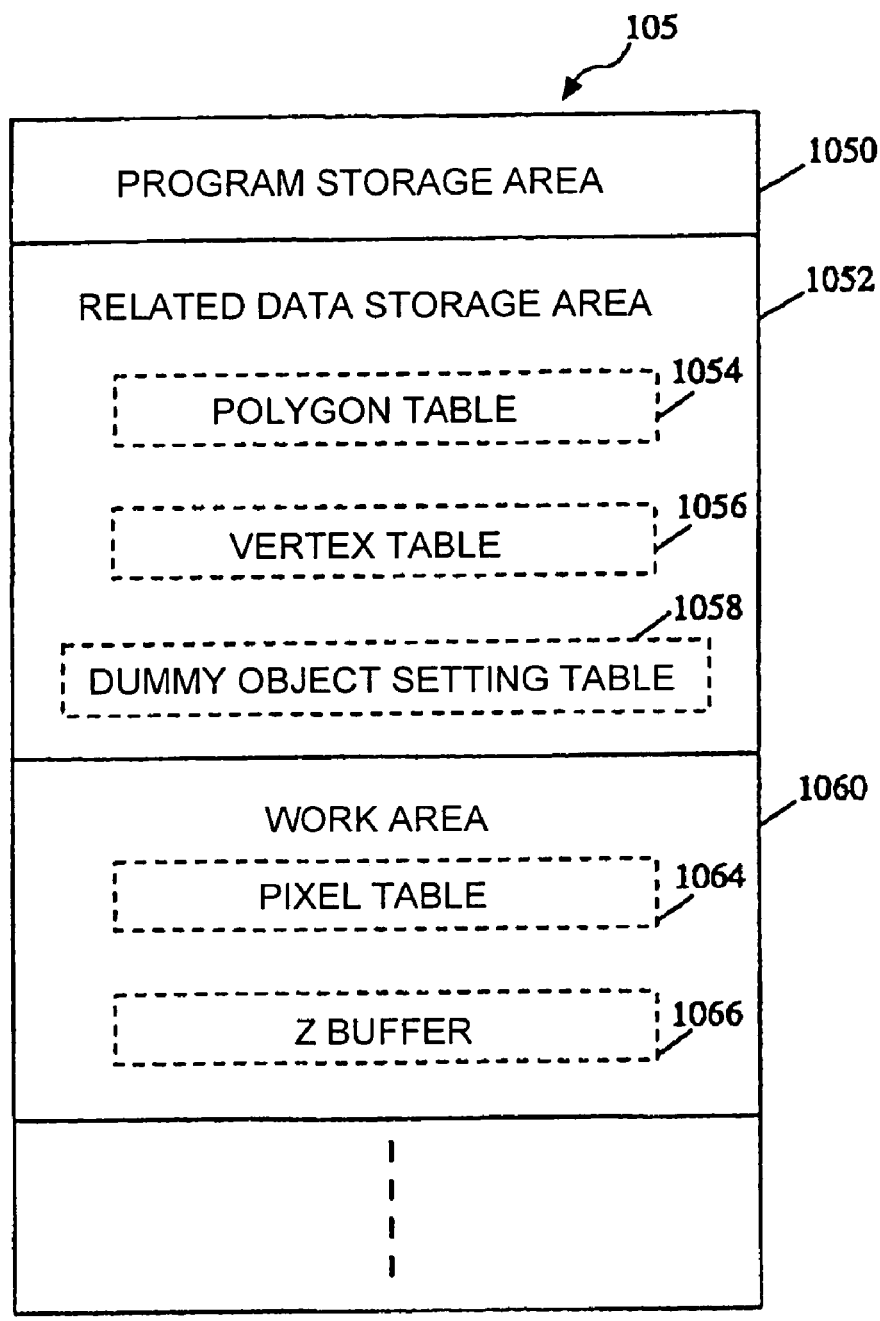
FIG. 14 is a block diagram to show a state of RAM in Embodiment 2.

In the present embodiment 2, FIG. 14 shows a state of the RAM 105, for example, where the program and data according to the embodiment 2 of the present invention, which were stored in the CD-ROM 131, are loaded in the RAM 105 by the CD-ROM drive 113 and the program according to the embodiment 2 of the present invention is executing. In the present embodiment the RAM 105 consists of at least the program storage area 1050, the related data storage area 1052, and the work area 1060. The program saved in the program storage area 1050 will be described hereinafter.

The related data storage area 1052 includes the polygon table 1054, the vertex table 1056, and the dummy object setting table 1058. The structure so far is the same as in Embodiment 1. The work area 1060 includes a pixel table 1064 and a Z buffer 1066 in place of the sort table 1062. There are, however, also cases in which the pixel table 1064 and Z buffer 1066 are provided in the frame buffer 112. A part of the work area 1060 is allocated in the frame buffer 112 in certain cases.

The polygon table 1054 included in the related data storage area 1052 is the same as that in Embodiment 1 and is illustrated in FIG. 3. The polygon table 1054 is a table for specifying the object(s) to be subjected to shading, polygons constituting each object, and vertexes constituting each of the polygons.

The vertex table 1056 included in the related data storage area 1052 is the same as in Embodiment 1 and is illustrated in FIG. 5. The vertex table 1056 is a table for specifying the object(s) to be subjected to shading, vertexes of polygons forming each object, coordinate values of the vertexes, and texture coordinates.

The dummy object setting table 1058 included in the related data storage area 1052 is the same as in Embodiment 1 as far as it is illustrated in FIG. 6. The dummy object setting table 1058 is a table for saving the data necessary for the shading operation for each of the objects to be subjected to shading. Namely, the table stores the data necessary for generation of the data of the dummy object used for the shading operation for each object to be subjected to shading. The object ID number column 581 stores the object ID numbers of the objects to be subjected to shading.

The lightness adjustment value column 585 stores the values for adjusting the lightness of the corresponding dummy object for each of the objects to be subjected to shading. The coordinate adjustment value column 587 stores the coordinate adjustment values for moving the dummy object so as to cause the appropriate deviation between the dummy object and the object to be subjected to shading with respect to the view point. The coordinate adjustment values are values in the world coordinate system. The depth adjustment value column 589 stores the values for adjustment of the Z value at each vertex of the polygons, for each of the polygons after the transparent transformation. Namely, the depth adjustment values are values for adjustment of the depth values in the screen coordinate system.

In the present embodiment, as described hereinafter, the depth values of the vertexes of the polygons are shifted backward after the transparent transformation, when viewed from the view point, upon drawing the polygons forming the dummy object. The backward shift causes the dummy object to be placed behind the corresponding object, as in Embodiment 1. By carrying out the processing as described above, only the part of the dummy object not overlapping with the original object to be subjected to shading can be drawn.

An example of the pixel table 1064 included in the work area 1060 is presented in FIG. 15. The pixel table 1064 is a table for storing color data to be displayed for the respective pixels. As illustrated in FIG. 15, the pixel table 1064 is provided with a column 641 of pixel ID number and a column 643 of color data (R, G, B). The pixel ID numbers are identification numbers assigned to the respective pixels of the display screen 120, as illustrated in FIG. 16. In the case of 240 pixels vertical and 320 pixels horizontal as illustrated in FIG. 16, the ID numbers are assigned in order, for example, from 0 at the left upper corner to 76799 at the right lower corner. The pixel table 1064 stores the color data per pixel ID number.

Figure 17:
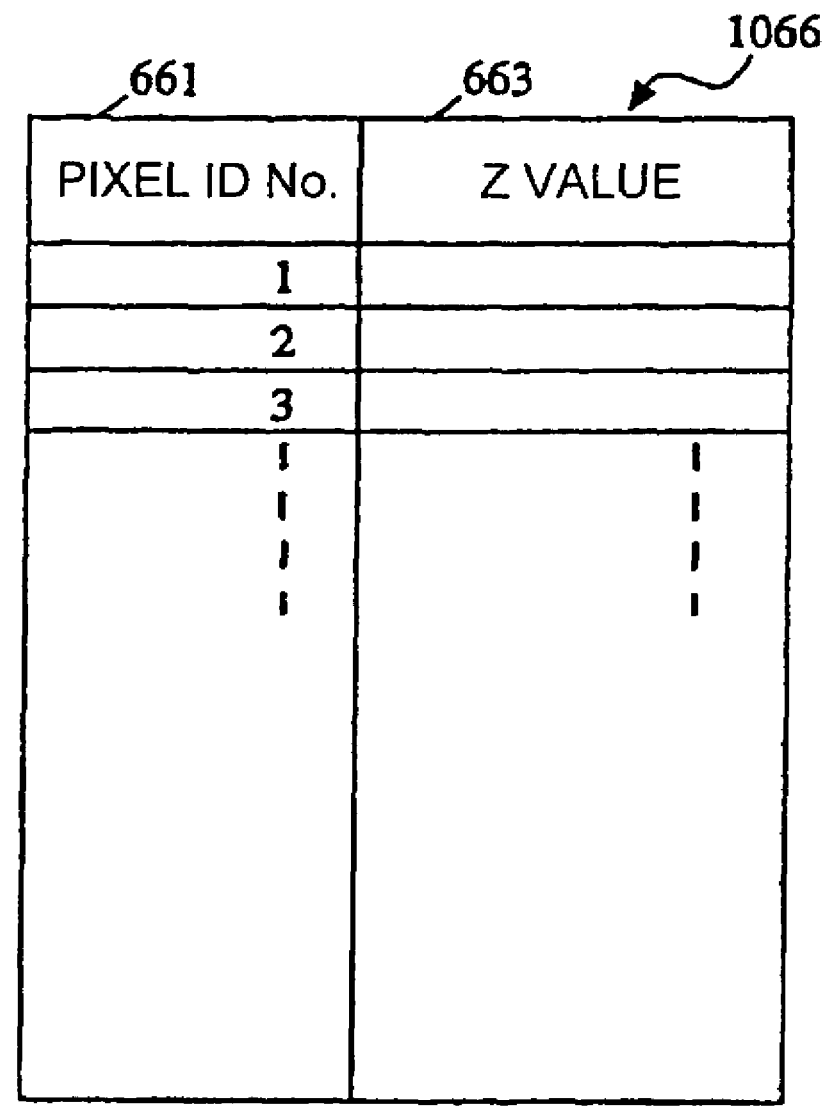

An example of the Z buffer 1066 included in the work area 1060 is presented in FIG. 17. The Z buffer 1066 is a table for storing the Z values of points (including the vertexes of polygons) inside the polygons, which are used as the basis of the color data stored in the pixel table 1064, for each of pixels. Therefore, the Z buffer 1066 is provided with a column 661 of pixel ID number and a column 663 of Z value.

The algorithm of the program in the present embodiment will be described below referring to FIG. 8, FIG. 18, and FIG. 19.

Upon starting, based on the operating system stored in the ROM or the like, the arithmetic processor 103 makes the CD-ROM drive 113 read the program and data necessary for execution of the image processing and the game out of the CD-ROM 131 and transfer them to the RAM 105. Then the arithmetic processor 103 executes the program transferred to the RAM 105, thereby implementing the processing described below.

It is noted here that among the control and processing carried out in the home-use game device 101 there are also some cases wherein the practical control and processing is carried out by circuitry outside the arithmetic processor 103 but in cooperation therewith. For convenience' sake of description, the control and processing associated with the arithmetic processor 103 will be described below as being assumed to be carried out directly by the arithmetic processor 103.

In practice the program and data necessary for execution of the image processing and the game are successively read out of the CD-ROM 131 according to the preceding circumstances of processing in response to a command from the arithmetic control unit 103 to be transferred to the RAM 105. In the description hereinafter, however, explanation will be omitted about the reading of data from the CD-ROM 131 and the transfer thereof to the RAM 105 for easier understanding of the invention.

The main flow associated with the display is the same as in Embodiment 1 as far as it is illustrated in FIG. 8. First, objects to be displayed are specified (step S1). Next, the drawing arithmetic process is carried out for one object out of the objects to be displayed (step S2). The drawing arithmetic process will be detailed hereinafter. It is then determined whether the drawing arithmetic process has been completed for all the objects to be displayed (step S3). If there exists an unprocessed object among the objects to be displayed, the flow will return to step S2. When the drawing arithmetic process has been completed for all the objects to be displayed, the drawing process is carried out into the frame buffer 112 (step S4). Then the image data stored in the frame buffer 112 is displayed on the display screen 120 of the TV set 121 (step S5).

In the present embodiment the drawing process is carried out by the Z buffer method. In the Z buffer method the drawing process into the frame buffer 112 is executed using a display list containing data of the polygons to be drawn. The data of polygons included in the display list contains the coordinates (including the depth value) in the screen coordinate system, texture coordinates, and color data at each vertex of the polygons.

In step S4, the data of polygons is read one by one out of the display list, and the interpolation treatment is carried out based on the coordinates, texture coordinates, and color data at the respective vertexes of the polygon to compute coordinates, texture coordinates, and color data of points inside the polygon. On this occasion, the depth value included in the coordinates of the points (including the vertexes of the polygon) inside the polygon is compared with the Z values in the Z buffer 1066 of the pixel ID numbers corresponding to coordinates of the points inside the polygon. Then the subsequent processing is performed only where the depth value is smaller.

Namely, the depth value is stored in the Z-value column 663 of the Z buffer 1066 in correspondence to the pixel ID number corresponding to the coordinates of a point inside the polygon. Then the texel value is read using the texture coordinates and a color of the pixel to be drawn is computed using the texel value and the color data obtained by the interpolation (or the color data of the vertexes of the polygon). The color of the pixel is stored in the color data column 643 of the pixel table 1064 in correspondence to the pixel ID number corresponding to the coordinates of the point inside the polygon. When the texture is not used, the color data obtained by the interpolation (or the color data of the vertexes of the polygon) is stored in the color data column 643 of the pixel table 1064 in correspondence to the pixel ID number corresponding to the coordinates of the point inside the polygon.

Therefore, if there exist a plurality of points inside the polygon to be projected to a single pixel, the color data of the closest point inside the polygon to the view point out of them will be stored in the pixel table 1064. When the closest point inside the polygon to the view point is a point inside the polygon constituting the original object, the color data at the point inside the polygon forming the original object is stored in the pixel table 1064 in correspondence to the pixel ID number corresponding to the pixel.

On the other hand, when the closest point inside the polygon to the view point is a point inside the polygon forming the dummy object, the color of the dummy object is stored in the pixel table 1064 in correspondence to the pixel ID number corresponding to the pixel. The color of the dummy object is the color data of the polygons of the dummy object.

Next, the drawing arithmetic process of step S2 will be described referring to FIG. 18. First, one unprocessed object to be displayed is specified (step S71). In the specification of one unprocessed object, for example, unprocessed objects are specified in the order from upper of the column for object identification number in polygon table (shown in FIG. 3). The present posture of the specified object is computed (step S73). Positions of the polygons constituting the object are modified so as to match with the present posture. It is then determined whether the present processing is for a dummy object (step S75). Since in the initial stage one unprocessed object was specified in step S71, the processing is not for a dummy object. Thus the flow transfers to step S77.

In step S77, data of the unprocessed object specified is prepared. Then the data of the unprocessed object thus prepared is subjected to the transparent transformation (step S81). The transparent transformation yields distances from the view point at the respective vertexes of each polygon, i.e., the depth values, for each of the polygons constituting the unprocessed object specified.

Next, for each of the polygons forming the unprocessed object specified (the object to be subjected to shading), the depth values at the respective vertexes of each polygon are adjusted by the depth adjustment value (step S83). The depth adjustment value is 0 during the processing of the unprocessed object specified. Therefore, this step is skipped virtually. Then the data of each polygon forming the unprocessed object specified is added to the display list (step S85).

Next, it is determined whether the above processing has been done for one unprocessed object specified (step S87). Since the processing has been made for the unprocessed object specified in the first execution, the processor transfers to step S89. In step S89, it is determined whether the unprocessed object specified is a target of the shading operation. In this step it can be determined by determining whether the unprocessed object is an object stored in the dummy object setting table 1058, with reference to the dummy object setting table 1058 of FIG. 6.

If the unprocessed object is an object not stored in the dummy object setting table 1058, the processor will transfer to step S3 of FIG. 8, because the shading process is not necessary. If the unprocessed object is an object stored in the dummy object setting table 1058 on the other hand, the processor will move to step S93. In step S93 the object to be processed is switched from one unprocessed object specified, to a corresponding dummy object.

Going back to step S75, the processor again determines whether the present processing is for a dummy object. Since the object to be processed was switched to the dummy object in step S93, the processor transfers to step S79 this time. The dummy object setting process is carried out in step S79. The dummy object setting process will be described in detail referring to FIG. 19.

Figure 19:
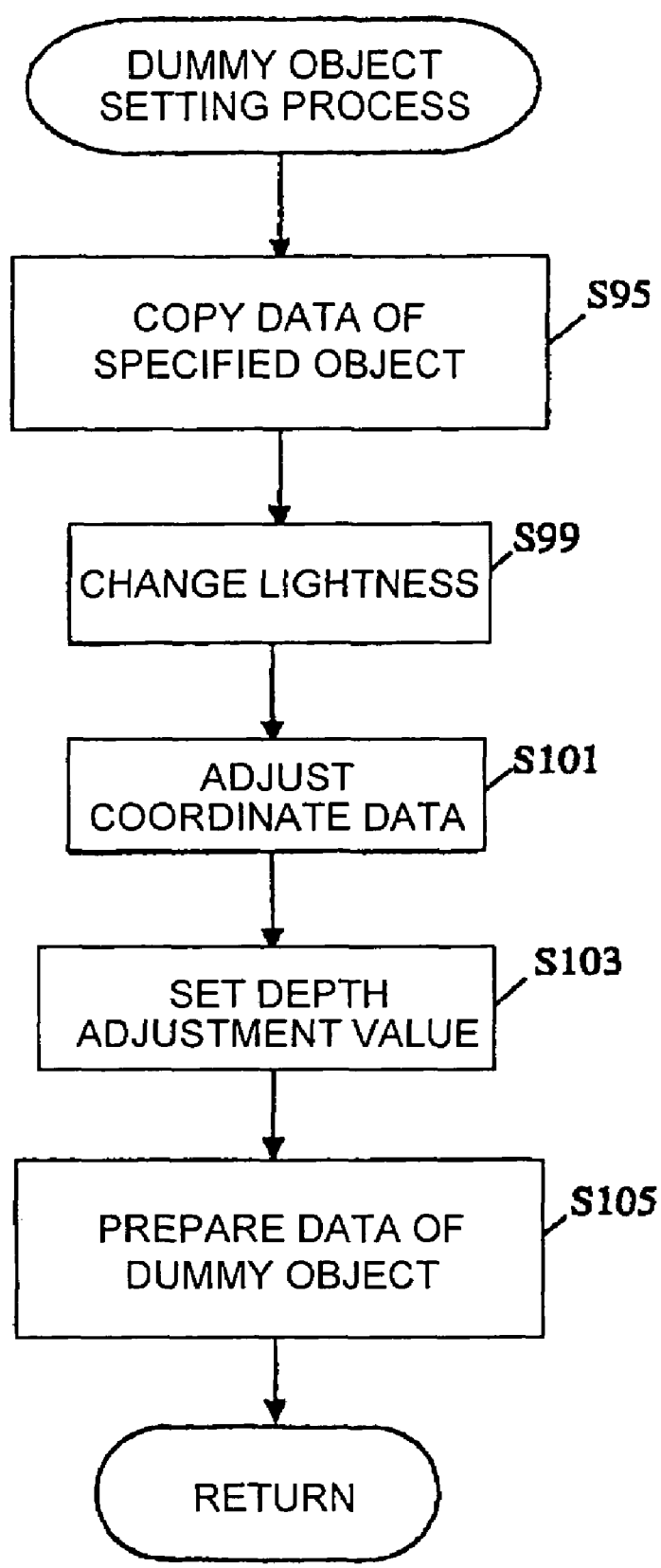
FIG. 19 is a flowchart to show a processing flow of the dummy object setting process in Embodiment 2.

In FIG. 19 a copy is first prepared from the data of the unprocessed object (the object to be subjected to shading) specified and is used as data of the dummy object (step S95). For example, the copy is made by reading in the data in the polygon table 1054 and the vertex table 1056. Then the lightness of the dummy object is changed (step S99). The lightness of the dummy object is adjusted using the data in the lightness adjustment value column 585 of the dummy object setting table 1058. Another potential method is a method of replacing the color data of the dummy object with the values stored in the lightness adjustment value column 585.

Next, adjustment is made for the coordinate data of the dummy object (step S101). The coordinate values in the coordinate adjustment value column 587 of the dummy object setting table 1058 are used for the adjustment of the coordinate data. Namely, the reference position of the dummy object is shifted by the coordinate adjustment values.

Figure 18:
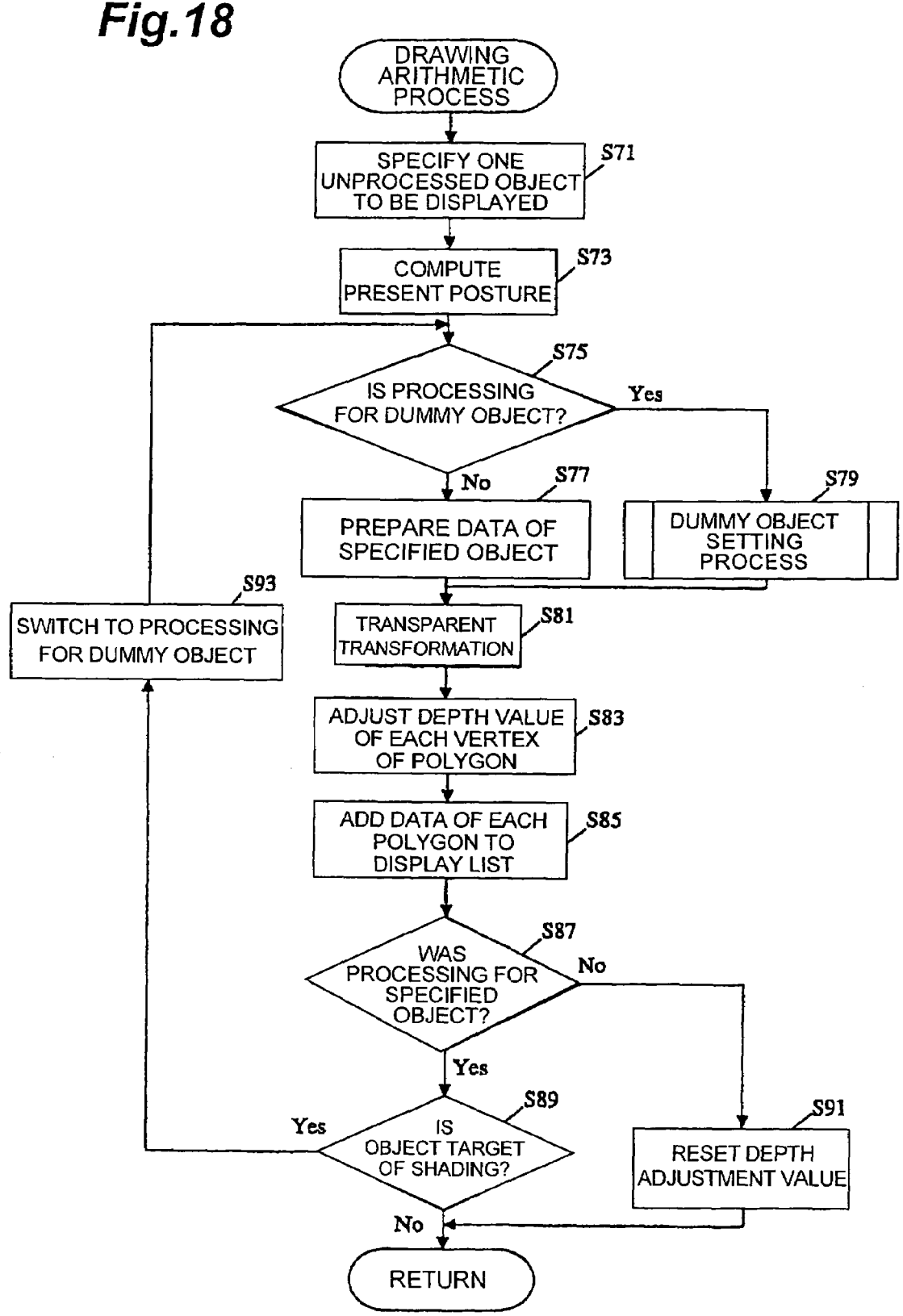
FIG. 18 is a flowchart to show a processing flow of the drawing arithmetic process in Embodiment 2.

Then setting of the depth adjustment value used in the step S83 of FIG. 18 is carried out (step S103). The value in the depth adjustment value column 589 of the dummy object setting table 1058 is used as the depth adjustment value. The data of the dummy object generated as described above is prepared for the transparent transformation (step S105). After this stage, the flow returns to step S81 of FIG. 18.

In FIG. 18 the data of the dummy object prepared is subjected to the transparent transformation (step S81). The transparent transformation yields the distances from the view point at the respective vertexes of each polygon, i.e., the depth values thereof, for each of the polygons constituting the dummy object. Then the depth value of each vertex of the polygon is adjusted by the depth adjustment value set in step S103 of FIG. 19, for each of the polygons constituting the dummy object. Namely, each polygon forming the dummy object is positioned behind the original object to be subjected to shading. Then the data of each polygon of the dummy object resulting from the adjustment of the depth value by the depth adjustment value is added to the display list (step S85).

It is then determined whether the object now under processing is the unprocessed object (the object to be subjected to shading) specified in step S71 (step S87). Since the object now under processing is the dummy object, the flow transfers to step S91. In step S91 the depth adjustment value is reset to 0 in accordance with completion of the processing of the dummy-object (step S91). Then the flow transfers to step S3 of FIG. 8.

The above processing results in adding the polygons forming the object to be subjected to shading to the display list as usual. On the other hand, the polygons constituting the dummy object corresponding to the object to be subjected to shading are added to the display list after the depth value of each vertex is set so as to be greater than that of the object to be subjected to shading. Then the hidden surface removal process by the Z buffer method is carried out according to the display list and the image is drawn into the frame buffer 112 and displayed on the display screen 120. The dummy object is thus drawn in the lightness different from that of the object to be subjected to shading except for the part overlapping with the object when observed from the view point; for example, the dummy object is drawn so as to be lighter or darker than the object.

In the present embodiment 2, the point is also that the dummy object is located relatively behind the original object to be subjected to shading. It can also be contemplated that, in step S83 of FIG. 18 in the processing of the original object to be subjected to shading, the depth value of each vertex of the polygon forming the original object to be subjected to shading is adjusted so that the original object to be subjected to shading is positioned ahead of the dummy object, i.e., located closer to the view point.

In the embodiment 2, the dummy object is generated for the object to be subjected to shading (step S95). Then the lightness of the dummy object is adjusted by the lightness adjustment values (step S99). Thereafter, the position of the dummy object is finely adjusted so that there is deviation between the straight line connecting the view point and the reference position of the object to be subjected to shading and the straight line connecting the view point and the position in the dummy object corresponding to the reference position of the object to be subjected to shading (step S101). After that, the object to be subjected to shading and the dummy object are drawn by the Z buffer method (step S4). Here each polygon forming the object to be subjected to shading is stored in the display list. On the other hand, each polygon forming the dummy object is added to the display list after the depth value of each vertex of the polygon is shifted backward when viewed from the view point (step S85).

Therefore, when there exists a plurality of polygons to be projected to a single pixel and when the polygon closest to the view point is a polygon forming the object to be subjected to shading, the pixel is drawn according to the color data of the point inside the polygon forming the object to be subjected to shading. On the other hand, when there exists a plurality of polygons to be projected to a single pixel and when the closest polygon to the view point is a polygon forming the dummy object, the pixel is drawn according to the color data of the point inside the polygon forming the dummy object, i.e., in the lightness different from that of the object to be subjected to shading. Finally, there remains only the part of the dummy object surrounding the edge of the object and this part is drawn so as to be brighter or darker than the object.

As a consequence, the enhanced display of the object is implemented by the shading in part of the contours of the object, so that the visibility of the object can be enhanced in the projection image drawn.

According to the present invention, the dummy object is generated by copying the data of the original object and setting the lightness different from that of the original object. Then the drawing process is executed to position the dummy object thus generated, obliquely behind the original object, whereby the shading can be effected in part of the contours of the object.

Therefore, the present invention obviates the need for carrying out the process of detecting the contour part (edge part) to be subjected to shading and carrying out the complicated processing of implementing the enhanced display of the detected contour part. The present invention realizes the process of shading in part of the contours of the object by the simple procedures, thereby permitting increase in the processing speed.

The increase of processing speed associated with the shading drawing operation is preferable particularly for the video games. In the video games, the position and shape of the object to be displayed, camera works, etc. vary sequentially according to operation input and the like. Then the projection images according to the sequentially varying contents have to be displayed instantly on the screen. If the processing associated with the shading drawing operation is complex, the image display speed will be slow even if the object can be drawn with shading. It is thus important that the procedures associated with the shading drawing operation be simple, in order to perform the shading drawing operation without decrease in the display speed.

Other Embodiments

The following modifications are applicable to the above embodiments 1 and 2

(Modification 1)

In the above description, each object was described as a whole model of a character in the video game. However, an object is allowed to be handled as part of a model. For example, it is also possible to set objects in partial units of the head, chest, right arm, left arm, etc. in a human game character and execute the processing of shading operation in the object units. When the objects are set in the partial units, thicknesses of edges to be subjected to shading can be set finely by setting the lightness adjustment values and the depth adjustment value for each part.

(Modification 2)

In the above description each dummy object was generated by copying the corresponding object, but the dummy object can also be formed more easily by setting the number of polygons forming the dummy object to a value smaller than the number of polygons forming the object. It is also possible to preliminarily prepare the data of the dummy object separately, without generating the dummy object from the object.

(Modification 3)

In the above description the processing was described on the basis of polygons, particularly, triangular polygons. It is, however, also possible to employ such a configuration that each of the objects to be subjected to shading and the dummy objects is composed of a plurality of polygons including polygonal polygons having four or more vertexes. Further, the processing may also be carried out under the condition that each of the objects to be subjected to shading and the dummy objects is composed of a plurality of surfaces including curved surfaces and each surface is approximated to a polygon or polygons.

(Modification 4)

Modifications of Hardware Used

FIG. 1 is just an example and there are a variety of potential modifications. For example, it is optional whether the system is provided with the communication interface 115. The system does not always have to be provided with the sound processor 109.

The CD-ROM is just an example of the storage medium and the storage medium can also be selected from other storage media including the internal memory such as the ROM, the CD-ROM, DVD-ROM, memory cartridge, floppy disc, magnetic disc, DVD-RAM, and so on. In such cases, the CD-ROM drive 113 needs to be modified so as to be able to read the information from the corresponding medium.

Further, the above embodiments of the present invention were the examples in which the present invention was realized by the computer program, but it can also be realized by a combination of the computer program with a dedicated device such as an electronic circuit or the like, or by only the dedicated device such as the electronic circuit.

The present invention was described above in detail based on the embodiments thereof, but it is noted that the present invention is by no means intended to be limited to the above embodiments. The present invention also embraces all modifications falling within the scope not departing from the essence thereof. For example, the above embodiments were the examples in which the present invention was realized on the platform of the home-use game machine, but the present invention may also be realized on the platform of the ordinary computers, arcade game machines, and so on. It can also be contemplated that the present invention is realized using either of personal digital assistants, car navigation systems, etc. as the platform.

It is also noted that the program and data for realizing the present invention are not limited to the form in which they are provided by the recording medium such as the CD-ROM or the like detachably mounted on the computer or the game machine. Namely, the program and data for realizing the present invention may also be provided in the form in which they are recorded in a memory on another device on the network 151 connected via the communication interface 115 and communication line 141 illustrated in FIG. 1 and in which the program and data are successively sent through the communication line 141 into the RAM 105 as occasion may demand.

In the above description the dummy object was introduced in order to enhance the visibility of the object in the projection image by the enhanced display of the object, but the present invention can also be applied to cases wherein accurate light source computation cannot be performed because of constraints on the processing time etc. or cases wherein the light source computation is not carried out on purpose. These are the cases wherein the dummy object is drawn for shading, instead of drawing of shading (contrast) obtained by the light source computation. Particularly, in the non-photorealistic rendering cases like cartoon animations, since realistic shading is not always necessary, the shade can be drawn against the object by simpler processing if the present invention is applied.

As described above, the present invention permits accomplishment of the enhanced display of the object by the shading in part of the contours around the object and thus can enhance the visibility of the object in the projection image.

What is claimed is:

1. A computer-readable storage medium storing a program for a video game, which draws an object in a virtual space,
   wherein said program is structured so as to make a computer perform:
   receiving object data representing an object at a particular instance of a virtual time-space continuum;
   generating a dummy object of said object, the dummy object having an identical shape of said object, by duplicating said object data;
   determining a first position of said object and a second position of said dummy object so that said dummy object thus generated is positioned behind said object and overlaps only in part with said object when observed from a view point, the orientation of said dummy object being the same as that of said object; and
   drawing, in a digital video frame representing said instance of said virtual time-space continuum, said object at said first position and drawing said dummy object at said second position except for an overlapping portion between said object and said dummy object when observed from the view point and wherein the drawing of said dummy object is in a second lightness different from a first lightness of said object, said second lightness being based on said first lightness.

2. The computer-readable storage medium according to claim 1, wherein the first position of said object and the second position of said dummy object are determined so that when observed from the view point there is deviation between a straight line connecting a predetermined reference position of said object and the view point and a straight line connecting the view point and a position in said dummy object corresponding to the predetermined reference position of said object.

3. The computer-readable storage medium according to claim 1, wherein in said drawing, said dummy object is drawn before said object is drawn.

4. The computer-readable so medium according to claim 1, wherein said drawing, a hidden surface removal treatment using a Z buffer is carried out to draw said object at said first position and draw said dummy object at said second position and in the lightness different from that of said object.

5. The computer-readable storage medium according to claim 1, wherein in said drawing, the second lightness is higher than the first lightness.

6. A computer-readable storage medium storing a program for a video game, which draws an object comprised of a plurality of polygons,
   wherein said program is structured so as to make a computer perform:
   receiving object data represent an object at a particular instance of a virtual time-space continuum;
   generating a dummy object of said object, the dummy object having an identical shape of said object, by duplicating said object data;
   setting a distance from a view point of each polygon forming said dummy object and said object so that said dummy object thus generated is positioned behind said object and overlaps only in part with said object when observed from the view point, the orientation of said dummy object being the same as that of said object; and
   drawing, in a digital video frame representing said instance of said virtual time-space continuum each polygon forming said object and drawing each polygon forming said dummy object in a second lightness different from a first lightness of a corresponding polygon of said object, in accordance with a drawing order of said polygons resulting from sequencing of said polygons from the greatest distance from the view point, set in said setting, and wherein the second lightness is based on the first lightness.

7. A computer-readable storage medium storing a program for a video game, which draws an object comprised of a plurality of polygons,
   wherein said program is structured so as to make a computer perform:
   receiving object data representing an object at a particular instance of a virtual time-space continuum;
   generating a dummy object of said object, the dummy object having an identical shape of said object, by duplicating said object data;
   setting a distance from a view point of each polygon forming said dummy object and said object so that said dummy object thus generated is positioned behind said object and overlaps only in part with said object when observed from the view point, the orientation of said dummy object being the same as that of said object; and
   drawing, in a digital video frame representing said instance of said vial time-space continuum a pixel according to a polygon having a distance closest to the view point set in said setting, out of polygons projectable into said pixel, wherein when the polygon projected into the pixel is a polygon forming said object, said pixel is drawn according to said polygon and wherein when the polygon projected into the pixel is a polygon forming said dummy object, said pixel is drawn in a second lightness different from a first lightness of the corresponding polygon of said object, and wherein the second lightness is based on the first lightness.

8. An object drawing method in a video game, which draws an object in a virtual space, said object drawing method comprising:
   receiving object data representing an object at a particular instance of a virtual time-space continuum;
   generating a dummy object of said object, the dummy object having an identical shape of said object, by duplicating said object data;
   determining a it position of said object and a second position of said dummy object so that said dummy object thus generated is positioned behind said object and overlaps only in part with said object when observed from a view point, the orientation of said dummy object being the same as that of said object; and drawing, in a digital video frame representing said instance of said virtual time-space continuum, said object at said first position and drawing said dummy object at said second position except for an overlapping portion between said object and said dummy object when observed from the view point and wherein the drawing of said dummy object is in a second lightness different from a first lightness of said object, said second lightness being based on said first lightness.

9. The object drawing method in the video game according to claim 8, wherein the first position of said object and the second position of said dummy object are determined so that when observed from the view point there is deviation between a straight line connecting a predetermined reference position of said object and the view point and a sit line connecting the view point and a position in said dummy object corresponding to the predetermined reference position of said object.

10. The object drawing method in the video game according to claim 8, wherein in said drawing, said object is drawn at said first position after said object is drawn at said second position.

11. An object drawing method in a video game, which draws an object comprised of a plurality of polygons, said object drawing method comprising:
   receiving object data representing an object at a particular instance of a virtual time-space continuum;
   generating a dummy object of said object, the dummy object having an identical shape of said object, by duplicating said object data;
   setting a distance from a view point of each polygon forming said dummy object and said object so that said dummy object thus generated is positioned behind said object and overlaps only in part with said object when observed from the view point, the orientation of said dummy object being the same as that of said object; and
   drawing, in a digital video frame representing said instance of said virtual time-space continuum, each polygon forming said object and drawing each polygon forming said dummy object in a second lightness different from a first lightness of a corresponding polygon of said object, in accordance with a drawing order of said polygons resulting from sequencing of said polygons from the greatest distance from the view point, set in said setting, and wherein the second lightness is based on the first lightness.

12. An object drawing method in a video game, which draws an object comprised of a plurality of polygons, said object drawing method comprising:
   receiving object data representing an object at a particular instance of a virtual time-space continuum;
   generating a dummy object of said object, the dry object having an identical shape of said object, by duplicating said object data;
   setting a distance from a view point of each polygon forming said dummy object and said object so that said dummy object thus generated is positioned behind said object and overlaps only in part with said object when observed from the view point, the orientation of said dummy object being the same as that of said object; and
   drawing, in a digital video frame representing said ice of said virtual time-space continuum, a pixel according to a polygon having a distance closest to the view point, set in said setting, out of polygons projectable into said pixel, where when the polygon projected into the pixel is a polygon forming said object, said pixel is drawn according to said polygon and wherein when the polygon projected into the pixel is a polygon forming said dummy object, said pixel is drawn in a second lightness different from a first lightness of the corresponding polygon of said object, and wherein the second lightness is based on the first lightness.

13. A video game apparatus, which comprises
   a computer-readable storage medium storing a program for a video game which draws an object in a virtual space; and
   a computer which reads out at least one part of said program from said recording medium to perform by reading out at least one of said program from said storage medium,
   receiving object data representing an object at a particular instance of a virtual time-space continuum;
   generating a dummy object of said object, the dummy object having an identical shape of said object, by duplicating said object data;
   determining a fist position of said object and a second position of said dummy object so that said dummy object thus generated is positioned behind said object and overlaps only in part with said object when observed from a view point, the orientation of said dummy object being the same as that of said object; and
   drawing, in a digital video frame representing said instance of said virtual time-space continuum, said object at said first position and drawing said dummy object at said second position except for an overlapping portion between said object and said dummy object when observed from the view point and wherein the drawing of said dummy object is in a second lightness different from a first lightness of said object, said second lightness being based on said first lightness.

14. A video game apparatus, which comprises
   a computer-readable storage medium storing a program for a video game which draws an object comprised of a plurality of polygons in a virtual space; and
   a computer which reads out at least one part of said program from said recording medium to perform, by reading out at least one of said program from said storage medium,
   receiving object data representing an object at a particular instance of a virtual time-space continuum;
   generating a dummy object of said object, the dummy object having an identical shape of said object, by duplicating said object data;
   setting a distance from a view point of each polygon forming said dummy object and said object so that said dummy object thus generated is positioned behind said object and overlaps only in part with said object when observed from the view point, the orientation of said dummy object being the same as that of said object; and
   drawing, in a digital video frame representing said instance of said virtual time-space continuum, each polygon forming said object and drawing each polygon forming said dummy object in a second lightness different from a first lightness of a corresponding polygon of said object in accordance with a drawing order of said polygons resulting from sequencing of said polygons from the greatest distance from the view point, set in said setting, and wherein the second lightness is based on the first lightness.

15. A video game apparatus, which comprises
   a computer-readable storage medium storing a program for a video game which draws an object comprised of a plurality of polygons in a virtual space; and a computer which reads out at least one part of said program from said recording medium to perform, by reading out at least one of said program from said storage medium, receiving object data representing an object at a particular instance of a virtual time-space continuum;

generating a dummy object of said object, the dummy object having an identical shape of said object, by duplicating said object data;

setting a distance from a view point of each polygon forming said dummy object and said object so that said object thus generated is positioned behind said object and overlaps only in part with said object when observed from the view point, the orientation of said object being the same as that of said object; and drawing, in a digital video frame representing said instance of said viral time-space continuum, a pixel according to a polygon having a distance closest to the view point, set in said setting, out of polygons projectable into said pixel, wherein when the polygon projected into the pixel is a polygon forming said object, said pixel is drawn according to said polygon and wherein when the polygon projected into the pixel is a polygon forming said dummy object said pixel is drawn in a second lightness different from a first lightness of the corresponding polygon of said object, and wherein the second lightness is based on the first lightness.

16. A video game apparatus which draws an object in a virtual space, said apparatus comprising:

a computer; and a computer-readable storage medium storing a program to be executed by said computer, wherein said program is structured so as to make said computer perform:

receiving object data representing an object at a particular instance of a virtual time-space continuum;

generating a dummy object of said object, the dummy object having an identical shape of said object, by duplicating said object;

determining a first position of said object and a second position of said dummy object so that said dummy object thus generated is positioned behind said object and overlaps only in part with said object when observed from a view point, the orientation of said dummy object being the same as that of said object; and drawing, in a digital video frame representing said instance of said virtual time-space continuum, said object at said first position and drawing said dummy object at said second position except for an overlapping portion between said object and said dummy object when observed from the view point and wherein the drawing of said object is in a second lightness different from a first lightness of said object, said second lightness being based on said first lightness.

17. A computer program for a video game, which draws an object in a virtual space, wherein said computer program is structured so as to make a computer perform:

receiving object data representing an object at a particular instance of a virtual time-space continuum;

generating a dummy object of said object, the dummy object having an identical shape of said object, by duplicating said object data;

determining a first position of said object and a second position of said dummy object so that said dummy object thus generated is positioned behind said object and overlaps only in part with said object when observed from a view point, the orientation of said dummy object being the same as that of said object; and drawing, in a digital video frame representing said instance of said virtual time-space continuum, said object at said first position and drawing said dummy object at said second position except for an overlapping portion between said object and said dummy object when observed from the view point and wherein the drawing of said dummy object is in a second lightness different from a first lightness of said object, said second lightness being based on said first lightness.

18. A computer program for a video game, which draws an object comprised of a plurality of polygons, wherein said computer program is structured so as to make a computer perform:

receiving object data representing an object at a particular instance of a virtual time-space continuum;

generating a dummy object of said object, the dummy object having an identical shape of said object, by duplicating said object data;

setting a distance from a view point of each polygon forming said dummy object and said object so that said dummy object thus generated is positioned behind said object and overlaps only in part with said object when observed from the view point, the orientation of said dummy object being the same as that of said object; and drawing, in a digital video frame representing said instance of said virtual time-space continuum, each polygon forming said object and drawing each polygon forming said dummy object in a second lightness different from a first lightness of a corresponding polygon of said object, in accordance with a drawing order of said polygons resulting from sequencing of said polygons from the greatest distance from the view point, set in said setting, and wherein the second lightness is based on the first lightness.

19. A computer program for a video game, which draws an object comprised of a plurality of polygons, wherein said computer program is structured so as to make a computer perform:

receiving object data representing an object at a particular instance of a virtual time-space continuum;

generating a dummy object of said object, the dummy object having an identical shape of said object, by duplicating said object data;

setting a distance from a view point of each polygon forming said dummy object and said object so that said dummy object thus generated is positioned bid said object and overlaps only in part with said object when observed from the view point, the orientation of said dummy object being the same as that of said object; and drawing, in a digital video fame representing said instance of said virtual time-space continuum, a pixel according to a polygon ha a distance closest to the view point, set in said setting, out of polygons projectable into said pixel, wherein when the polygon projected into the pixel is a polygon forming said object, said pixel is drawn according to said polygon and wherein when the polygon projected into the pixel is a polygon forming said dummy object, said pixel is drawn in a second lightness different from a first lightness of the corresponding polygon of said object, and wherein the second lightness is based on the first lightness.

20. A computer-readable storage medium storing a program for a video game, which generates an object in a virtual three dimensional space, wherein said program is structured so as to make a computer perform:

receiving object data representing an object at a particular instance of a virtual time-space continuum;

generating, based on said object data, an object comprising a plurality of vertexes at a first position in the vial three dimensional space;

generating, based on said object data, a dummy object of said object by copying the plurality of vertexes for such object, the dummy object having the same shape and orientation as the object;

adjusting the luminance values for the dummy such that the luminance values for the dummy are different than the corresponding luminance values for the object, said luminance values for the dummy based on the corresponding luminance values for the object;

adjusting the position of the dummy object to a second position in the vial three dimensional space shifted from the first position such that least a portion of the dummy object does not overlap the object when viewed from a selected viewpoint; and drawing, in a digital video frame representing said instance of said virtual time-space continuum said object at said first position and drawing said dummy object at said second position except for an overlapping portion between said object and said dummy object when observed from the selected view point, the dummy object being drawn with the adjusted luminance values, and the drawing of the object and the dummy object at the respective first and second positions adjusted such that the dummy object is positioned behind said object and overlaps only in part with said object when observed from the selected view point.

21. The computer-readable storage medium as recited in claim 20 wherein the drawing of the object and the dummy object at the respective first and second positions is adjusted such that the dummy object is positioned behind said object by adding polygons corresponding to the dummy object to a z-sort table after a shift of the first address of the sort table.

* * * * *